United States Patent [19]
Roszhart

[11] Patent Number: 6,032,531
[45] Date of Patent: *Mar. 7, 2000

[54] MICROMACHINED ACCELERATION AND CORIOLIS SENSOR

[75] Inventor: Terry V. Roszhart, West Paterson, N.J.

[73] Assignee: Kearfott Guidance & Navigation Corporation, Wayne, N.J.

[ * ] Notice: This patent is subject to a terminal disclaimer.

[21] Appl. No.: 08/906,218

[22] Filed: Aug. 4, 1997

[51] Int. Cl.⁷ .......................... G01C 19/00; G01P 15/10
[52] U.S. Cl. ................... 73/504.04; 73/514.15; 73/514.29
[58] Field of Search ................ 73/504.02, 504.03, 73/504.04, 504.12, 504.14, 504.15, 514.02, 514.15, 514.16, 514.29, 514.34, 514.35

[56] References Cited

U.S. PATENT DOCUMENTS

| | | |
|---|---|---|
| 3,614,678 | 10/1971 | Engeler et al. . |
| 4,230,953 | 10/1980 | Wilcox . |
| 4,488,131 | 12/1984 | Griffin et al. . |
| 4,945,765 | 8/1990 | Roszhart . |
| 5,001,933 | 3/1991 | Brand . |
| 5,018,858 | 5/1991 | Malvern . |
| 5,203,208 | 4/1993 | Bernstein ................. 73/504.12 |
| 5,261,277 | 11/1993 | Thomas et al. ........... 73/514.15 |
| 5,315,874 | 5/1994 | Petrovich et al. . |
| 5,334,901 | 8/1994 | Albert et al. . |
| 5,341,682 | 8/1994 | Hulsing, II . |
| 5,349,316 | 9/1994 | Sterns . |
| 5,396,798 | 3/1995 | Frische .................... 73/514.32 |
| 5,627,316 | 5/1997 | De Winter et al. ....... 73/514.32 |
| 5,656,778 | 8/1997 | Roszhart ................... 73/504.04 |

Primary Examiner—Hezron Williams
Assistant Examiner—Helen C. Kwok
Attorney, Agent, or Firm—Klauber & Jackson

[57] ABSTRACT

A solid state silicon micromachined acceleration and Coriolis (MAC) sensor that measures linear and angular motion. The MAC sensor is a single device that performs the functions of a conventional accelerometer and a gyroscope simultaneously. The MAC sensor is unique in that it is a differential dual stage device using only one micromachined proof mass to measure both linear and angular motions. The single proof mass is connected to opposing electromechanical resonators in a monolithic microstructure made from single crystal silicon. This unique design offers improvements in measurement performance and reductions in fabrication complexity that are beyond the state the art of earlier micromachined inertial sensors.

39 Claims, 16 Drawing Sheets

- PROOF MASS VELOCITY VECTOR 5
- ROTATION VECTOR 6
- RESONATOR 4
- SUBSTRATE 1
- RESONATOR 3
- PROOF MASS 2
- CORIOLIS FORCE VECTOR 7

- PROOF MASS FLEXURE 8
- PROOF MASS FLEXURE 9
- PROOF MASS FLEXURE 10
- CORIOLIS FORCE VECTOR 7
- PROOF MASS FLEXURE 11
- ROTATION VECTOR 6
- PROOF MASS 2
- PROOF MASS VELOCITY VECTOR 5

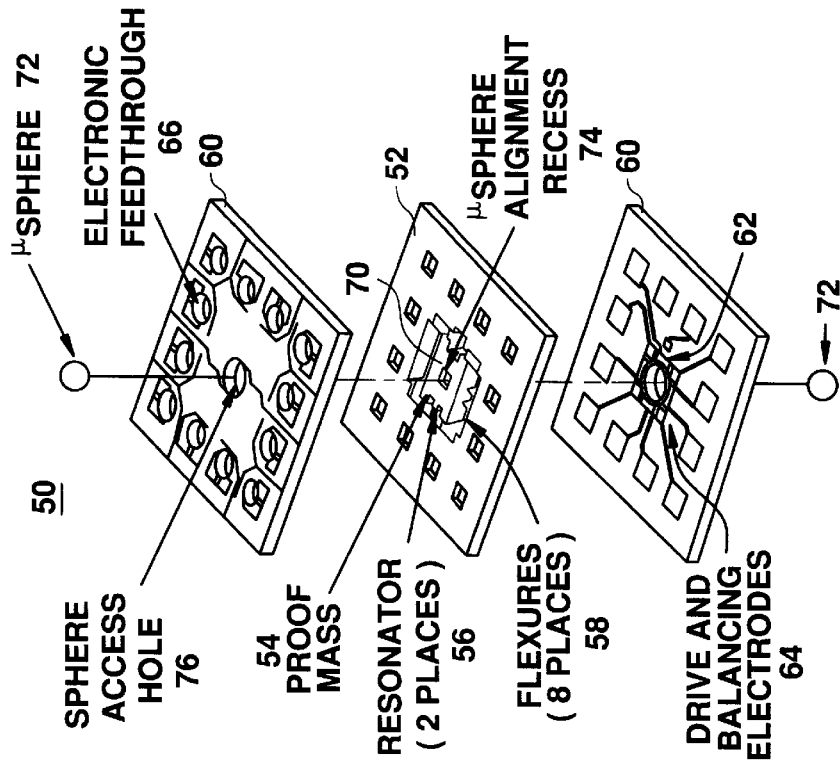

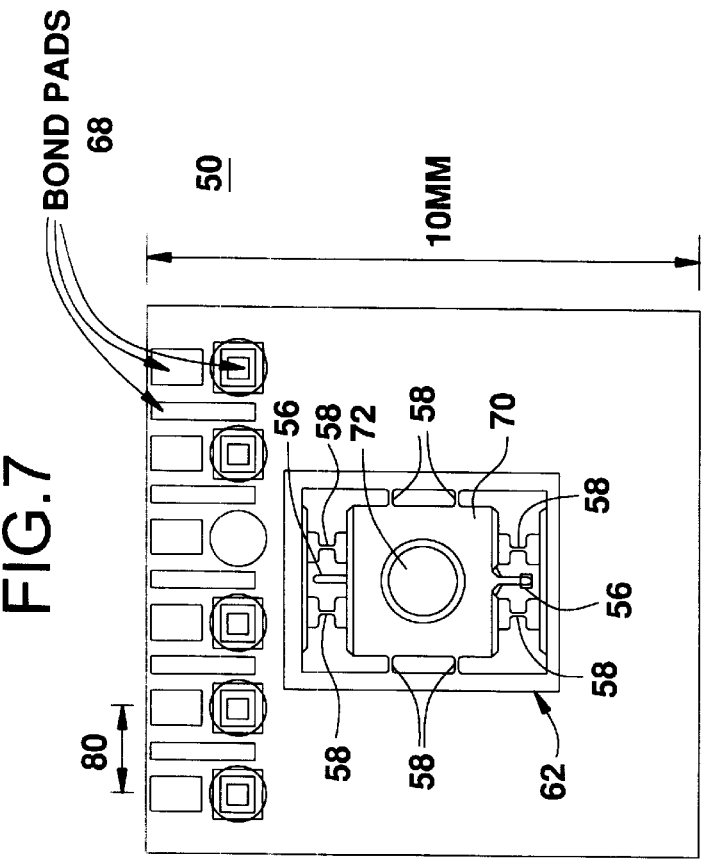
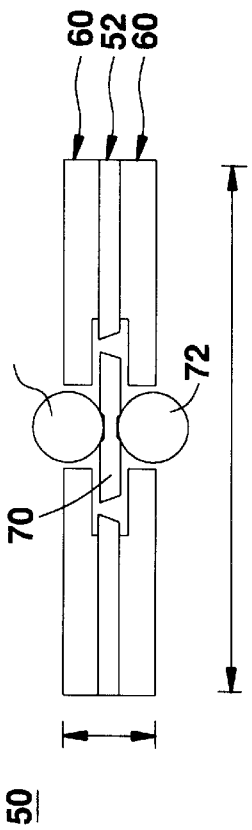
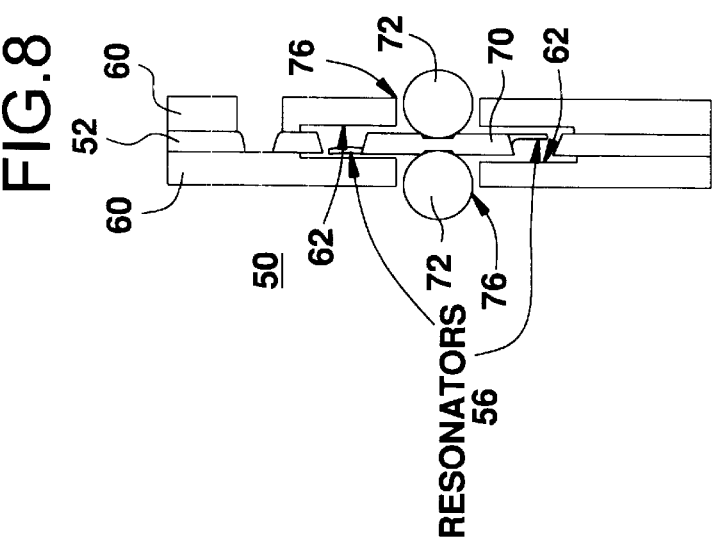

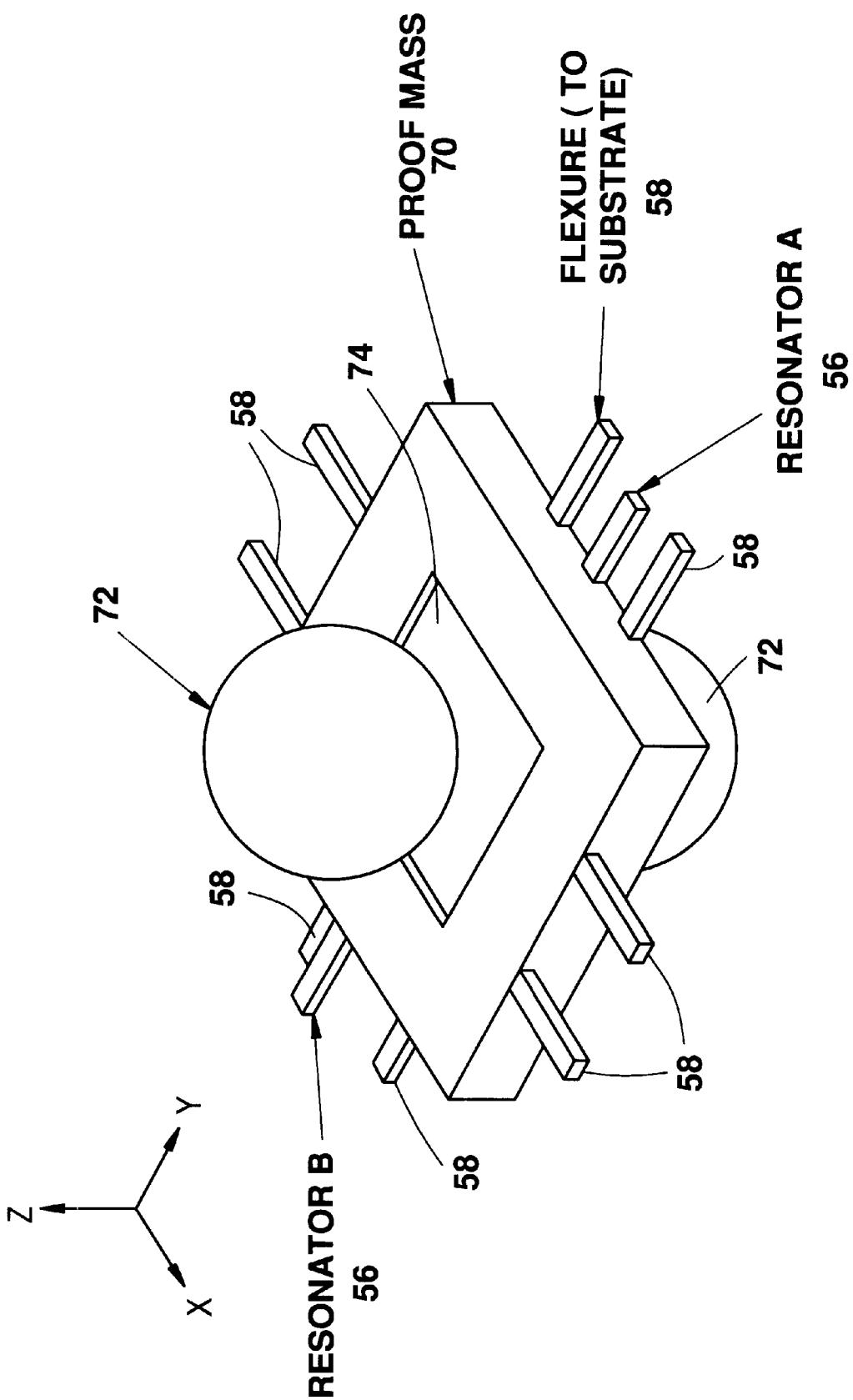

SUBSTRATE ACCELERATION

$a_z$ $\vec{F}_a = \vec{m} a_z$

MICROMACHINED ACCELERATION AND CORIOLIS SENSOR

FIELD OF THE INVENTION

The present invention relates generally to linear and angular motion sensors and, more particularly, to a solid state silicon micromachined acceleration and Coriolis sensor that measures linear and angular motion.

DESCRIPTION OF THE PRIOR ART

Previous attempts to develop inertial multisensors can be divided into three general categories. The first of these consists of a triad of accelerometers that are dithered about a common axis using a rotational or flexural mechanism. Since at least three accelerometers are being oscillated simultaneously, this approach usually requires the most volume and power. This method is not monolithic and considerable complexity of design is needed to make electrical contact with the individual vibrating accelerometers.

There is a second approach that uses two oppositely vibrating proof masses and two magnetically driven resonators to sense both rotational and linear motion. This approach uses a monolithic structure that controls the dither motion and the Coriolis response of the proof masses as well as the vibrational motion of the resonators. Since there are two proof masses, a mechanical "phase link" is also needed to assure anti-parallel proof mass motion. The monolithic nature of this structure is advantageous in relation to the benefits of batch micromachining methods but the integration of two proof masses in one sensor greatly increases the design complexity. This increased complexity imposes design limits that effect sensor performance and fosters a multitude of unwanted parasitic vibrational modes that impair measurement accuracy. The need for two proof masses also increases sensor power and volume.

A third category of devices consists of micromachined structures that exhibit two modes of vibration that are orthogonally oriented. As the device rotates about its sensitive axis, vibrations in one mode are coupled into the dual orthogonal mode. Measurements of the device rotation can then be made by sensing the magnitude of the vibration occurring in this second mode. Unfortunately, this second mode operates at the same frequency as the first mode. This means that small perturbations in mode orthogonality, fabrication tolerances, or electrical cross talk can also couple energy between modes. This produces an error signal that appears as a false rotation and reduces the accuracy of this type of sensor. In addition, this type of sensor is often insensitive to linear acceleration and cannot measure rotational and linear motions simultaneously.

SUMMARY OF THE INVENTION

The present invention contemplates a solid state silicon micromachined acceleration and Coriolis (MAC) sensor that measures linear and angular motion. The MAC sensor is a single device that performs the functions of a conventional accelerometer and a gyroscope simultaneously. Thus the MAC sensor can be used as a motion control sensor in military or commercial settings. One application is in miniature inertial guidance and navigation systems where issues of size, weight, performance, and cost are important.

The MAC sensor is unique in that it is a differential dual stage device using only one micromachined proof mass to measure both linear and angular motions. The single proof mass is connected to opposing electromechanical resonators in a monolithic microstructure made from single crystal silicon. This unique design offers improvements in measurement performance and reductions in fabrication complexity that are beyond the state the art of earlier micromachined inertial sensors.

The MAC sensor retains all of the advantages of earlier types of solid state sensors. The MAC sensor has no rotating parts and its motion sensing assembly does not have any of the material interfaces or joints that contribute to measurement errors. It can be fabricated from existing micromachining processes and offers the economies of size, weight, and cost that are typical of the integrated circuit industry.

Since the MAC sensor can measure both linear and angular motions, only three MAC sensor chips are needed for a full six axis inertial measurement instrument. Alternate configurations are possible that can provide four and even six axes of measurement on a single chip. As a result, the MAC sensor has the potential to establish a new generation of motion sensors that are small, inexpensive, rugged, and well suited to many applications, including advanced inertial guidance and navigations systems and other applications which required high levels of performance.

Accordingly, the primary objective of the present invention is to provide a solid state silicon micromachined acceleration and Coriolis (MAC) sensor that measures linear and angular motion.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now being made to the appended drawings. The drawings should not be construed as limiting the present invention, but are intended to be exemplary only.

FIG. 6 is an exploded perspective view of a sensor chip assembly according to a second embodiment of the present invention.

FIG. 7 is a top view of another configuration of the second embodiment of the present invention, shown without a top cap.

FIG. 8 is a side view of the sensor of FIG. 7 showing a top cap, a silicon device layer, and a bottom cap.

FIG. 9 is an end view of the sensor of FIG. 7 showing a top cap, a silicon device layer, and a bottom cap.

FIG. 10 is a perspective view of a proof mass, a pair of offset opposing resonators, eight flexure supports, and two microspheres, according to the second embodiment of the present invention.

DETAILED DESCRIPTION OF THE PRESENT INVENTION

A first embodiment and various alternate configurations thereof are presented in FIGS. 1A–5B. A second embodiment and various alternate configurations thereof are presented in FIGS. 6–18.

I. Mechanical Design of a First Embodiment

Figure 1A:
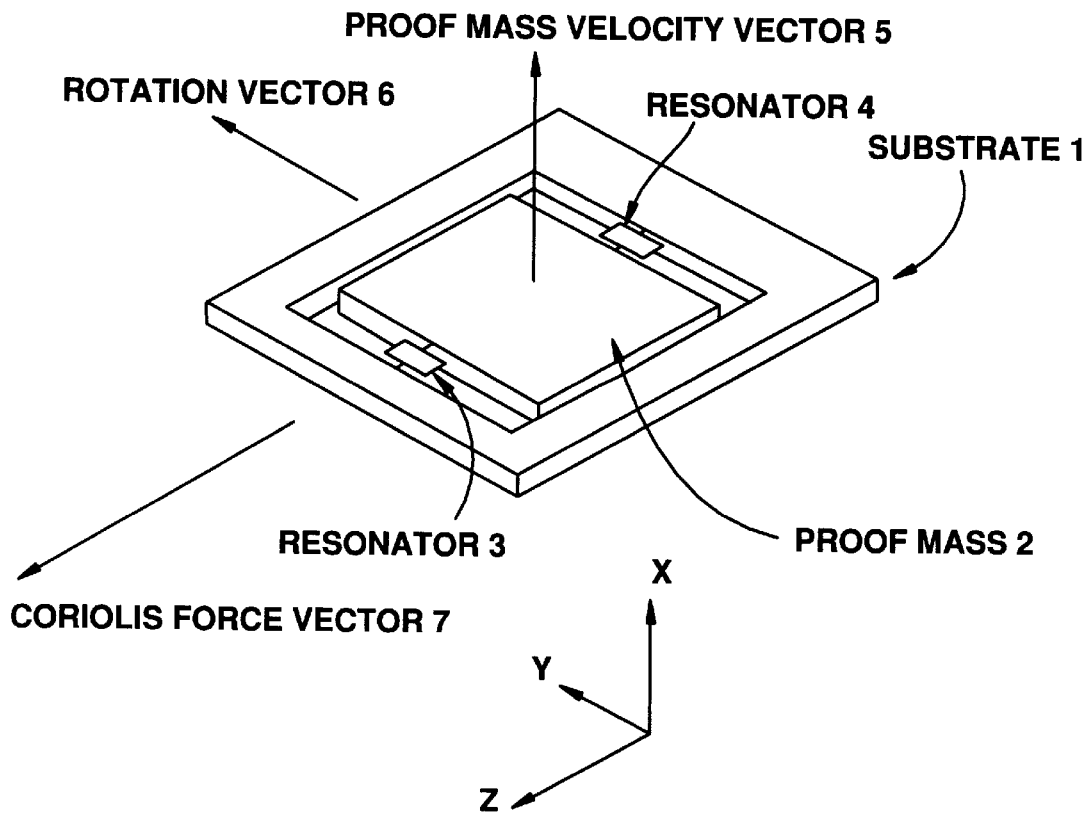
FIG. 1A is a top perspective view of a monolithic electromechanical structure of a solid state silicon micromachined acceleration and Coriolis (MAC) sensor according to a first embodiment of the present invention.
Figure 1B:
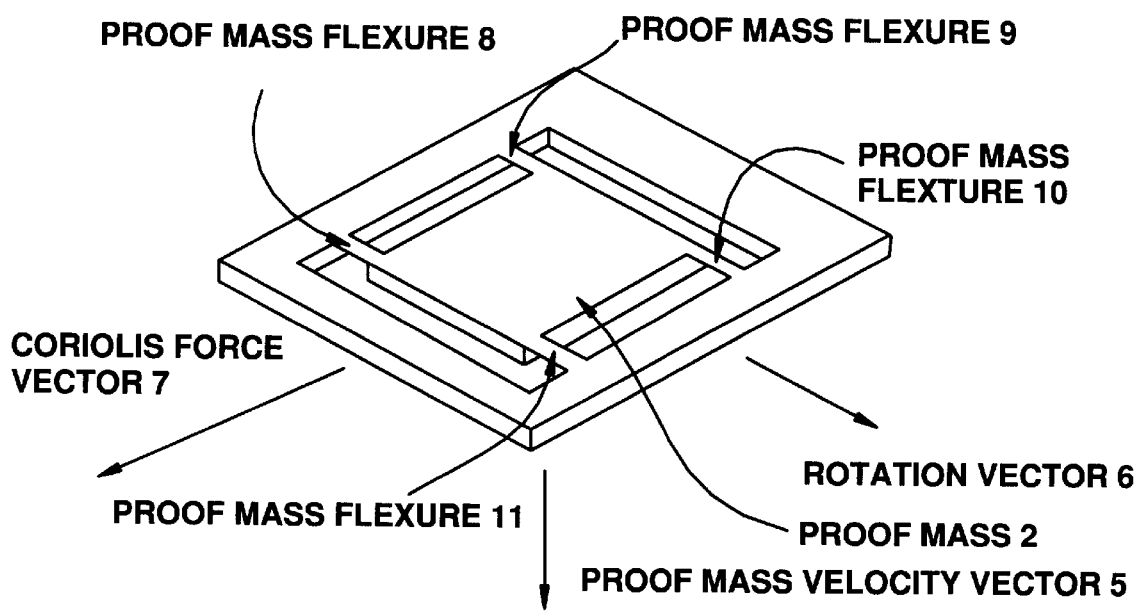
FIG. 1B is a bottom perspective view of the monolithic electromechanical structure shown in FIG. 1A.
Figure 2:
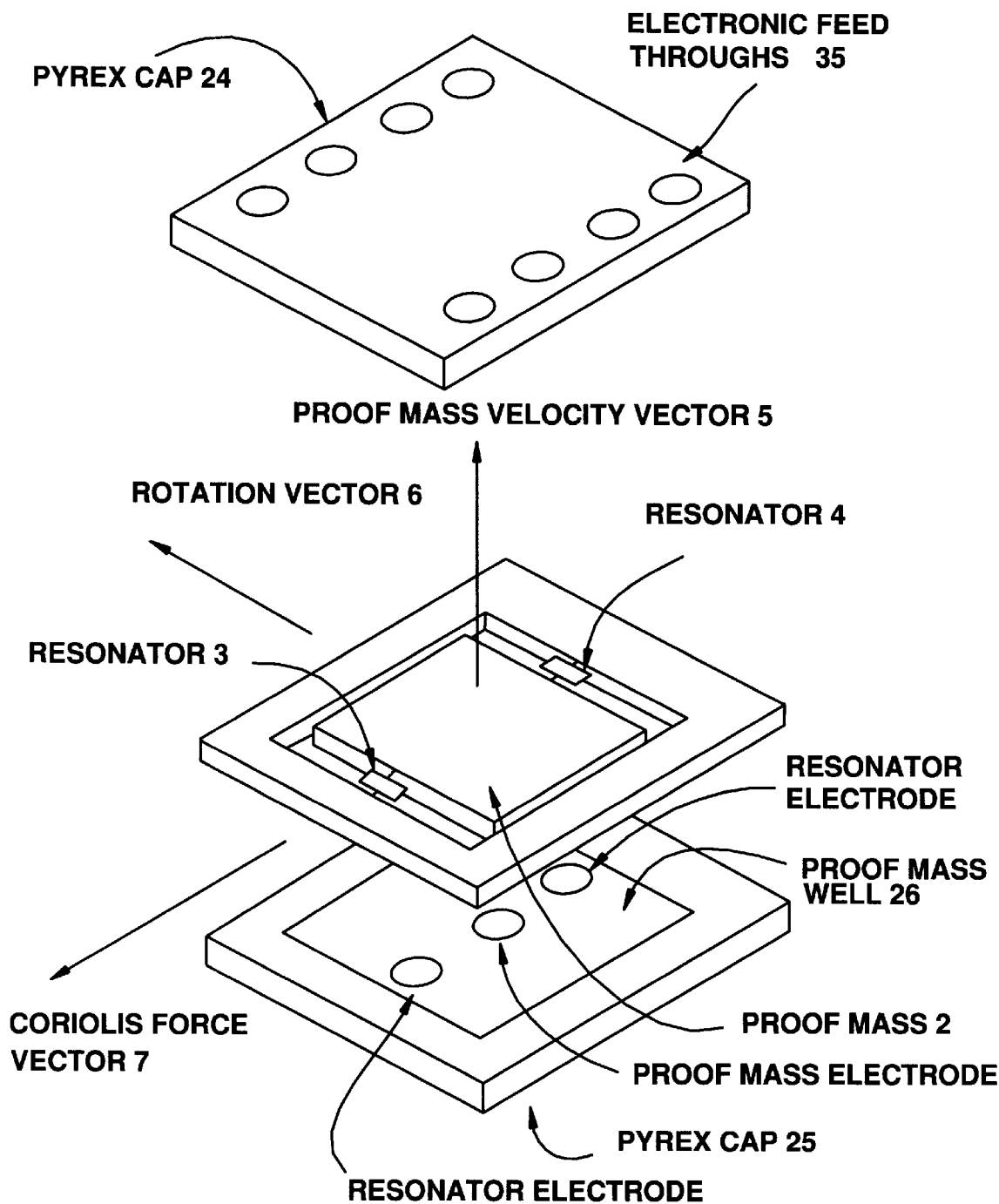
FIG. 2 is an exploded top perspective view of a solid state silicon micromachined acceleration and Coriolis (MAC) sensor chip assembly according to a first embodiment of the present invention.
Figure 3:
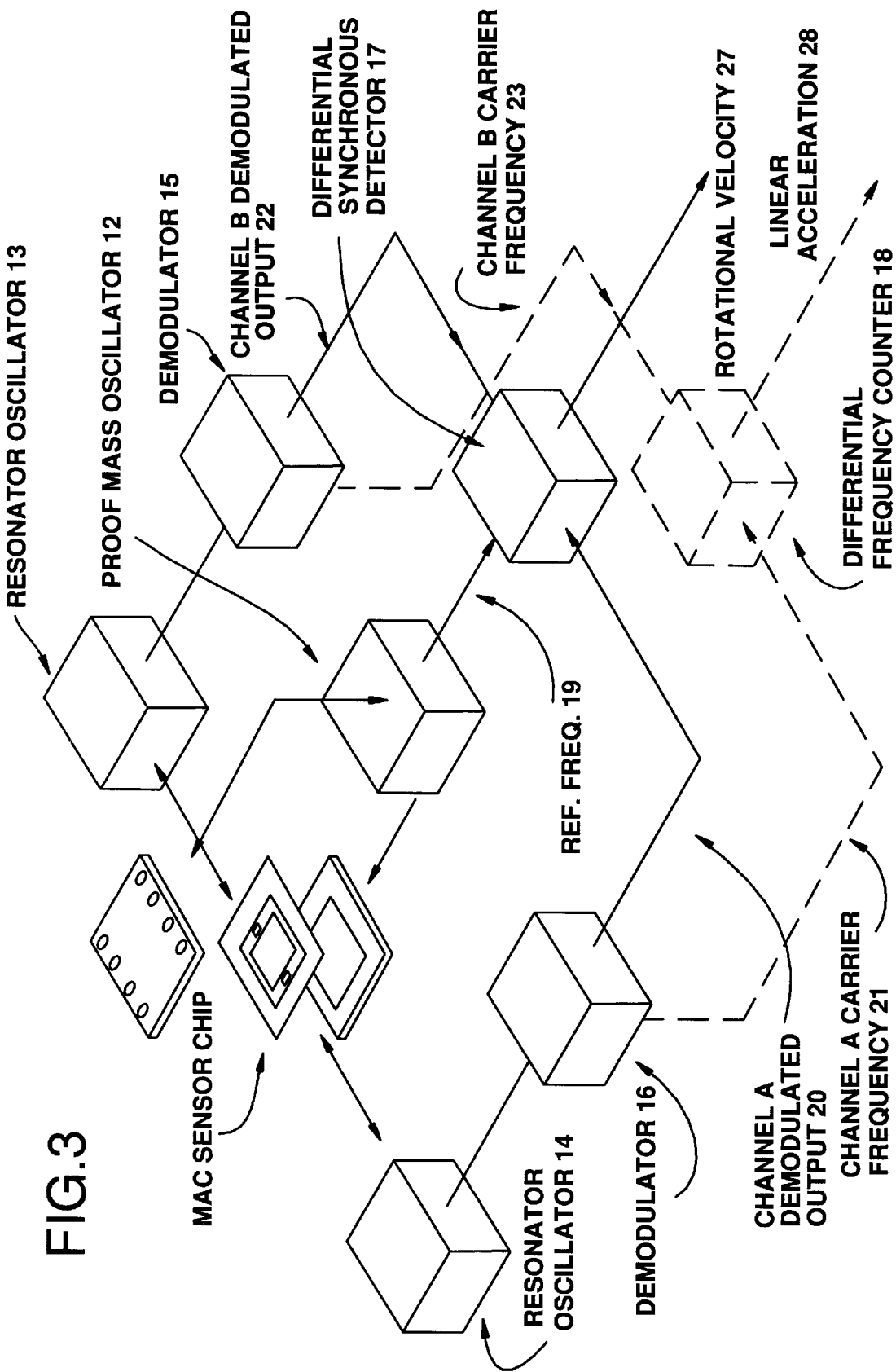
FIG. 3 is an exploded top perspective view of an electronic signal processing system for a solid state silicon micromachined acceleration and Coriolis (MAC) sensor according to the present invention.

The elements of a micromachined acceleration and Coriolis (MAC) sensor according to a first embodiment of the present invention are shown in FIGS. 1–3. A monolithic electromechanical structure that is the central feature of the MAC sensor is shown in FIG. 1. This structure performs all the mechanical functions of the sensor. This structure is bonded into a microchip assembly that is connected to an electronic signal processing system. The details of the first embodiment of the MAC sensor microchip are shown in FIG. 2, and an electronic signal processing system is shown in FIG. 3.

A. Chip Design

The electromechanical structure that is central to the first embodiment of the MAC sensor chip consists of a frame like substrate 1, a vibrating mass 2, two flexural resonators 3 and 4, and four flexural supports 8, 9, 10, and 11. This is a monolithic structure that can be formed in single crystal silicon wafers using established microlithography and micromachining techniques.

This structure is further described with respect to the right handed xyz coordinate system shown in FIG. 1. The proof mass 2 is driven by electrostatic forces that cause it to vibrate in the direction 5 that is coincident with the x axis. The flexural resonators 3 and 4 are oriented along the z axis. It is shown later that the rotation sensitive axis of this sensor is perpendicular to these directions and lies along the vector 6 coincident with the y axis. The acceleration sensitivity of the sensor is located along the z axis.

The silicon structure of FIG. 1 is bonded to two Pyrex glass or silicon caps 24 and 25 that are shown in FIG. 2. Both of these caps have proof mass wells 26 that are etched into the caps' surfaces. These wells are recessed an amount sufficient to allow for the vibrational motion of the proof mass perpendicular to the xy plane. The wells also contain metallic electrode patterns that are used to vibrate the proof mass 2 and the resonators 3 and 4. Electroplated feedthrough holes 35 are formed in the caps to make electrical contact to the inside of the chip. These feedthroughs have topside electrode patterns that can be used for wire bonding.

The caps are also fabricated from wafers and are bonded to the center silicon wafer before being diced into the rectangular chips. This makes it possible to use batch fabrication methods that permit the manufacturing of all the individual sensors on a single wafer assembly at one time. This greatly reduces the labor and cost of these devices.

B. Electronics Design

The microchip of the first embodiment shown in FIG. 2 is die bonded into a vacuum tight hybrid package and connected to the electronic signal processing system shown in FIG. 3. Item 12 represents an electronic oscillator that is used to drive the proof mass 2 at its resonant frequency. This is done through the metallic electrodes that are located on the microchip caps. This oscillator also provides a reference frequency 19 that is used by the signal electronics for synchronous detection of demodulated output signals 20 and 22, as will be described more fully below.

Items 13 and 14 are additional oscillators that are used to drive the individual flexural resonators 3 and 4. These resonators have natural resonant frequencies that are approximately equal and are much greater than the natural frequency of the proof mass. It is shown below that the frequencies of the resonators are modulated by the linear acceleration and Coriolis forces produced by the proof mass. This process is known as heterodyning or frequency modulation.

The frequency modulated output of each of these oscillators is sent to their respective demodulators, items 15 and 16, where the resonators' average frequencies are removed from the signals. The output of the demodulators is then sent to two dual stage detectors 17 and 18 to produce outputs that are proportional to linear acceleration and rotational velocity.

It is important to note that the resonators 3 and 4 have been placed at opposite ends of proof mass 2. This was done so that the acceleration and Coriolis forces applied to each resonator are equal in magnitude and opposite in sign. When the signals from each channel of the MAC sensor electronics are combined at the dual stage detectors 17 and 18, the parts of the signals that are proportional to each acceleration and rotation signal are added (to double the sensitivity) and the common mode parts are subtracted (to reduce measurement errors). The outputs 27 and 28 are, therefore, true differential signals that are proportional to the linear acceleration and angular rotational velocity that are applied to the sensor chip.

II. Principles of Operation of the First Embodiment

The micromachined acceleration and Coriolis (MAC) sensor is a highly integrated device that provides for the simultaneous, differential measurement of linear and angular motion using only one monolithic proof mass. Despite the multiplicity of functions, the MAC sensor offers a structural simplicity that is not found in earlier sensors of the same type. To explain its operation, the proof mass, resonator, and signal detection subsystems will be described separately. In particular, the propagation of the acceleration and rotational signals, as well as the measurement errors, through the sensor system will be discussed.

A. Proof Mass Forces

1. Linear Acceleration

The prime function of the proof mass in the first embodiment is to apply forces to the MAC resonators that are related to the inertial motion of the sensor. One of these forces is produced by acceleration in the z direction. When the substrate is accelerated along this axis, the inertia of the proof mass produces a counterforce that is restrained by the resonators at each end. According to Newton's law, the force produced by linear acceleration is $$F_a = m_{pm} a_z \tag{1}$$

wherein $F_a$ is the linear acceleration force, $m_{pm}$ is the mass of the proof mass, and $a_z$ is the linear acceleration.

When the sensor is accelerated along the z axis, the proof mass produces a force in resonator 3 that is tensile, and a force is resonator 4 that is compressive.

2. Rotational Coriolis Force

The Coriolis "force" is actually an apparent acceleration attributed to a body that is in motion with respect to a rotating coordinate system. If the proof mass in the first embodiment shown in FIG. 1 is vibrating in the direction 5, and, if the sensor substrate is rotating about the direction 6, then a Coriolis force will be produced in direction 7 which is simultaneously perpendicular to both the velocity and rotation vectors. This Coriolis force oscillates at the frequency of the proof mass and modulates the natural resonant frequency of the two resonators 3 and 4. Each of these resonators then produces a frequency modulated carrier signal that is sensed by the signal processing electronics shown in FIG. 3.

The magnitude of the Coriolis force that is imposed on the proof mass in the first embodiment is the cross product of the proof mass velocity vector 5 and the coordinate rotation vector 6 and is given by $$F_c = 2 m_{pm} v \Omega_y \tag{2}$$

wherein $F_c$ is the Coriolis force, v is the velocity of the proof mass, and $\Omega_y$ is the inertial rotation velocity along the y-axis.

In order to evaluate this equation, it is necessary to compute the proof mass velocity. Since the proof mass 2 is harmonically driven by the oscillator 12, its equation of motion is given by $$x = x_{pm} \sin((\omega_{pm} t)) \tag{3}$$

wherein x is the displacement of the proof mass, $\omega_{pm}$ is the resonant frequency of the proof mass, and $x_{pm}$ is the displacement magnitude of the proof mass. This equation is differentiated with respect to time to give the proof mass velocity.

$$v = \omega_{pm} x_{pm} \cos(\omega_{pm} t) \tag{4}$$

This result can be substituted into equation (1) to give $$F_c = 2 m_{pm} \omega_{pm} \Omega_y x_{pm} \cos(\omega_{pm} t) \tag{5}$$

Equation (5) describes the magnitude of Coriolis force that is produced by the vibrating proof mass 2. It is directed along the z direction and oscillates at the frequency of the proof mass.

The Coriolis force in the first embodiment is applied to both of the two resonators 3 and 4 that support the proof mass in the z direction. Assuming that the flexure supports 8, 9, 10, and 11 offer negligible stiffness in the z direction, then the force applied to the two resonators is $$F_{c3} = \frac{F_c}{2} \tag{6}$$

$$F_{c4} = \frac{F_c}{2} \tag{7}$$

wherein $F_{c3}$ is the Coriolis force applied to resonator 3, and $F_{c4}$ is the Coriolis force applied to resonator 4.

It should be noted that the resonators have been positioned so that the Coriolis force that is applied to each resonator is equal in magnitude but opposite in direction. For example, when resonator 3 is in tension, resonator 4 is in compression.

B. Resonator Frequency Modulation

1. Signal Analysis

In the first embodiment, the resonators 3 and 4 are flexurally mounted "beam like" structures that exhibit a natural mechanical resonance and a sensitivity to in-plane (z axis) mechanical forces. In the absence of an in-plane force each resonator vibrates at a natural resonance determined by the mass and stiffness of the structure. When an in-plane force is applied to the resonator, the frequency is changed at a rate that depends upon the buckling load of the structure. In particular, if the applied force is tensile, then the resonator's frequency increases. If the force is compressive, the frequency decreases. This frequency response is given by $$\omega = \omega_o + k_1 F_T + k_2 F_T^2 \tag{8}$$

wherein $\omega_o$ is the natural frequency of the resonator, $k_1$ is the linear frequency scale factor, $F_T$ is the total net force applied to the resonator along the z-axis, and $k_2$ is the nonlinear frequency scale factor.

The first term in this equation is the natural frequency of the resonator and is determined by the mass and stiffness of the structure. The second term of this equation, is the term that describes the force sensitivity of the resonator. The last term shown in equation (8), accounts for the nonlinearity of the resonator's force sensitivity. Additionally, higher order terms are predicted by beam theory, but are usually small enough that they can be ignored for most analyses.

The forces produced by the linear acceleration and rotational velocity are given by equations (1), (6), and (7). Substituting these into equation (8) gives $$\omega = \omega_o + \Delta\omega_a(t) + \Delta\omega_c(\omega_{pm}) + \Delta\omega_n(2\omega_{pm}) \tag{9}$$

wherein $\Delta\omega_a(t)$ is the frequency shift due to acceleration and is equal to $k_1 m_{pm} a_z$, $\Delta\omega_c(\omega_{pm})$ is the frequency shift due to rotation and is equal to $k_1 2 m_{pm} \omega_{pm} \Omega_y x_{pm} \cos(\omega_{pm} t)$, and $\Delta\omega_n(2\omega_{pm})$ is the frequency shift due to nonlinearity and is equal to $k_2 (F_a + F_c)^2$.

Equation (9) shows the explicit time dependence of the various terms. In particular, the acceleration term and Coriolis term have separate time dependencies which will allow their separation in the signal processing scheme described later.

2. Error Analysis

The resonators are also sensitive to additional parameters that are not part of the inertial motion to be measured. These additional parameters contribute to the sensor's noise and could contribute to measurement uncertainties. These error mechanisms are described by $$\Delta\omega_e = \Delta\omega_T + \Delta\omega_\epsilon + \Delta\omega_g + \Delta\omega_s \tag{10}$$

wherein $\Delta\omega_e$ is the frequency shift due to errors, $\Delta\omega_T$ is the frequency shift due to temperature, $\Delta\omega_\epsilon$ is the frequency shift due to substrate strain, $\Delta\omega_g$ is the frequency shift due to electrostatic gap changes, and $\Delta\omega_s$ is the frequency shift due to resonator strain.

The first term in equation (10) provides for the change in frequency caused by changes in resonator temperature. For silicon this term is linear in temperature and is defined by $$\Delta\omega_T = \alpha_T \omega_o T \tag{11}$$

wherein $\alpha_T$ is the temperature coefficient, and T is the temperature.

Other resonator materials, such as quartz, exhibit nonlinear terms that are too significant to ignore and would need to be included in this equation.

The second term in equation (10) describes the change in frequency caused by strain in the sensor substrate. This strain can be caused by mounting stress, by residual material stress generated during thermal fabrication cycles and sensor chip assembly, or by general long term aging. In particular, this term is defined by $$\Delta\omega_\epsilon = k_1 \epsilon_s E A_r \tag{12}$$

wherein $\epsilon_s$ is the substrate strain, E is the modulus of elasticity, and $A_r$ is the resonator cross sectional area.

Both equations (11) and (12) describe measurement errors that are relatively independent of time and have, at most, a very slow time variation.

The third term in equation (10) is an adjustment that must be made to account for the change in the resonator's electrostatic gap that occurs when the proof mass is oscillating in the x direction. Note that this term is 90 degrees out of phase with the proof mass motion and will eventually be eliminated by the signal processing electronics. This term is defined by $$\Delta\omega_g = \chi x \sin(\omega_{pm} t) \tag{13}$$

wherein $\chi$ is the electrostatic gap coefficient.

The last term in equation (10) accounts for a frequency modulation that is caused by stretching of the resonator when the proof mass moves in the x direction. This motion produces a tension in the resonator that is tensile for both directions of the x motion. As a result, the frequency shift caused by resonator stretching is proportional to the square of the proof mass displacement according to $$\Delta\omega_s = \gamma x^2 = 5\gamma x_{pm}^2 (1 - \cos 2\omega_{pm} t) \tag{14}$$

wherein $\gamma$ is equal to $k_1 E A_r / (2L^2)$, and L is the length of the resonator.

Note that this last term has a time independent part and a part that oscillates at twice the proof mass frequency. This is because the resonator stretching is proportional to the square of the proof mass displacement.

3. Resonant Oscillator Analysis

Equations (9) and (10) can now be combined to analyze the response of each resonator. Arbitrarily assigning resonator 3 to channel A and resonator 4 to channel B gives the following equations.

$$\omega_A = \omega_o + \Delta\omega_a(t) + \Delta\omega_c(\omega_{pm}) + \Delta\omega_n(2\omega_{pm}) + \Delta\omega_e \tag{15}$$

$$\omega_B = \omega_o - \Delta\omega_a(t) - \Delta\omega_c(\omega_{pm}) + \Delta\omega_n(2\omega_{pm}) + \Delta\omega_e \tag{16}$$

These equations describe the frequency output of each channel as modulated by the linear acceleration, rotational velocity, and assorted error mechanisms. The voltage outputs of each oscillator can also be determined. In particular, the voltage output of channel A is given by $$V_A = V_o (\cos(\omega_A + M_{1A} \cos(\omega_{pm} t) + M_2 \cos(\omega_{pm} t))) \tag{17}$$

wherein $V_o$ is the oscillator output voltage, $$\omega_A = \omega_o - \Delta\omega_a(t) + \Delta\omega_n(t) + \Delta\omega_T + \Delta\omega_{68} \tag{18}$$

$$M_{1A} = M_c + iM_g \tag{19}$$

$$M_c = \frac{|\Delta\omega_c|}{\omega_{pm}} \tag{20}$$

$$M_g = \frac{|\Delta\omega_g|}{\omega_{pm}} \tag{21}$$

$$M_2 = M_n + M_s \tag{22}$$

$$M_n = \frac{|\Delta\omega_n|}{2\omega_{pm}} \tag{23}$$

$$M_s = \frac{|\Delta\omega_s|}{2\omega_{pm}} \tag{24}$$

Similar equations are used for channel B, as follows $$V_B = V_o (\cos(\omega_B + M_{1B} \cos(\omega_{pm} t) + M_2 \cos(\omega_{pm} t))) \tag{25}$$

$$\omega_B = \omega_o - \Delta\omega_a(t) + \Delta\omega_n(t) + \Delta\omega_T + \Delta\omega_{68} \tag{26}$$

$$M_{1B} = -M_c + M_g \tag{27}$$

Equations (15) through (27) now describe the output of both channels in terms of the signal terms and error terms. Both channels are similar and differ only in the signs that precede the signal terms. It is shown below, that all error terms are canceled by the differential dual stage nature of the MAC sensor geometry and electronic signal processing.

C. Signal Demodulation

Each of the resonators 3 and 4 are connected to their own oscillators 13 and 14. Each oscillator, in turn, is connected to one of two signal processing paths which make up the separate channels of a dual stage electronic system. Since each signal path is identical, the description of the signal processing system can be covered by explaining one path only.

The oscillator 14 senses the instantaneous frequency of the resonator 3 and provides a feedback signal of equal frequency and phase to maintain the resonator's vibrational motion. This feedback signal can also be monitored by the signal processing electronics to determine the resonator's instantaneous frequency.

In normal operation, all indices of modulation (M) are maintained (by design) at a value much less than unity. According to angular modulation theory, the output of the oscillator can be divided into separate terms; the carrier wave operating at the resonator's unmodulated frequency and two sidebands operating at the sum and difference of the modulating frequencies. This process, known as heterodyning, transforms a signal at a low frequency (i.e., the proof mass frequency) into a band of frequencies centered around the higher frequency of the resonator.

The oscillator output is detected in the demodulator circuit 16. This circuit could be a phase locked loop (PLL) or another type of frequency discriminator circuit. In either case, the function of the demodulator is to identify the carrier frequency and separate it from the oscillator output. The output of the demodulator is the carrier signal with the frequency given by equation (18) for channel A and equation (26) for channel B. This output contains the linear acceleration signal as well as terms relating to the natural resonator frequency, thermal frequency shift, residual strain effects, and offsets caused by resonator stretching and nonlinearities.

The second output of the demodulator is a signal containing the time dependent terms that originally modulated the resonator. This output is an AC voltage given by $$V'_A = \alpha G(M_{1A} \sin(\omega_{pm}t) + M_2 \sin(\omega_{pm}t)) \quad (28)$$

for channel A and by $$V'_B = \alpha G(M_{1B} \sin(\omega_{pm}t) + M_2 \sin(\omega_{pm}t)) \quad (29)$$

for channel B wherein $\alpha$ is the frequency conversion coefficient (volts/hertz), and G is the system gain (volt/volt). This output contains the rotational velocity signal as well as error signals caused by gap fluctuations and resonator stretching.

D. Dual Channel Detection

Equations (15), (16), (28), and (29) are the outputs of the resonators after processing through both channels of the signal processing electronics. One pair of these (equations 15 and 16) describe the signals that are used to determine the sensor's linear acceleration. The remaining pair (equations 28 and 29) provide the rotational velocity.

In particular, the linear frequency signals (eq. 14 and eq. 15) are combined in the differential frequency counter 18. This circuit measures the frequency of each of its inputs and provides an output that is the difference of the inputs. This results in the linear output $$\omega_A - \omega_B = 2\Delta\omega_a(t) = 2k_1 m_{pm} a_z(t) = \Delta\omega \quad (30)$$

wherein $$a_z(t) = \frac{\Delta\omega}{2k_1 m_{pm}} \quad (31)$$

This shows that the final output frequency is proportional to linear acceleration. The common mode error terms caused by the resonator's natural frequency, thermal shifts, residual stress, and resonator stretching have been compensated by the differential function of the dual channel counter 18.

The individual, single stage, Coriolis outputs of the MAC sensor are connected together with the proof mass reference signal 19 at the dual stage, synchronous detector 17. This circuit multiplies both Coriolis outputs by the proof mass reference signal to remove the time dependent cosine factors in equations (28) and (29). The only portions of these signals that are coherent and in phase with the proof mass reference signal are $$V''_A = \alpha G \Delta \omega_c \quad (32)$$

$$V''_B = -\alpha G \Delta \omega_c \quad (33)$$

Due to the differential nature of detector 17, its final output is $$|V''_A - V''_B| = |\Delta V''| = 2\alpha G |\Delta \omega_c| = 2\alpha G(2k_1 m_{pm} \omega_{pm} x_{pm} \Omega_y) \quad (34)$$

This is a DC voltage that is proportional to the rotational velocity and can be used to measure this quantity using $$\Omega_y = \frac{|\Delta V''|}{\beta} \quad (35)$$

wherein $$\beta = 4\alpha G k_1 m_{pm} \omega_{pm} x_{pm} \quad (36)$$

Once again, the differential function of this circuit has removed the error terms that are not coherent with the proof mass. The result is a Coriolis signal, the amplitude of which is proportional to rotational velocity and is free of common mode errors.

Equations (31) and (35) describe the final outputs of the MAC sensor. These equations are most accurate if resonators 3 and 4 are exactly identical and exhibit the same resonant frequencies and sensitivities. If, due to manufacturing tolerances and material variations, the resonators are not ideally matched, then equations (31) and (35) could be expanded into Taylor series that would use the frequencies or voltages of both stages. These expanded formulas can accurately account for small differences in resonator performance and can model the errors that would result from these differences.

E. Performance Estimates of the First Embodiment

Estimates of the performance of the first embodiment of the MAC sensor can be calculated from the preceding analysis. For example, Table 1 lists values of MAC sensor parameters that are consistent with current micromachining and electronic design practices.

TABLE 1

PERFORMANCE ESTIMATES

| | SYMBOLS | VALUES | UNITS |
|---|---|---|---|
| INERTIAL MOTION | | | |
| LINEAR ACCELERATION | $a_z$ | 100 | G |
| ROTATIONAL VELOCITY | $\Omega_y$ | 3.49 | rad/sec |
| PROOF MASS | | | |
| WIDTH | | .60 | cm |
| LENGTH | | .60 | cm |
| THICKNESS | | .05 | cm |

TABLE 1-continued

PERFORMANCE ESTIMATES

|  | SYMBOLS | VALUES | UNITS |
|---|---|---|---|
| MASS | $m_{pm}$ | .042 | gm |
| RESONANT FREQUENCY | $\omega_{pm}$ | 31,400 | rad/sec |
| DITHER AMPLITUDE | $x_{pm}$ | 1 | microns |
| RESONATOR |  |  |  |
| NATURAL FREQUENCY | $\omega_o$ | 624,500 | rad/sec |
| FORCE SENSITIVITY | $k_1$ | 16.90 | rad/sec/dyne |
| SINGLE STAGE DEMODULATOR OUTPUT |  |  |  |
| REFERENCE VOLTAGE |  | 5 | volt |
| DEMODULATION COEFFICIENT | $\alpha$ | .0016 | volt/(rad/sec) |
| SYSTEM GAIN | G | 200 | volt/volt |
| DUAL STAGE SENSITIVITIES |  |  |  |
| LINEAR ACCELERATION |  | 111 | Hz/G |
| ROTATIONAL VELOCITY |  | 1.42 | volt/(rad/sec) |

These parameters predict a full scale acceleration output of 11.1 Khz at an input of 100 G (19,600 cm/sec$^2$). The rotational velocity output would be 4.96 volts with an input of 200°/sec (3.49 rad/sec). This shows that both the linear acceleration and the rotational velocity outputs provided by the MAC sensor are reasonable in magnitude and can be easily measured.

III. Unique Features of the First Embodiment

The micromachined acceleration and Coriolis sensor is a unique design that has several inherent advantages. All of these features stem from the geometry of the suspension system used to support the proof mass and resonator within the sensor chip.

1. Single Proof Mass Design

The fact that only one proof mass is needed to produce differential outputs for both linear and angular measurements offers several benefits. The first is a reduction in size of approximately 2 to 1 relative to dual proof mass designs. This not only reduces the size of the final sensor chip but also increases the number of chips that can be arranged on a single fabrication wafer. This last effect can greatly reduce the cost of individual chips when produced in large quantities.

The use of only one proof mass also reduces power requirements needed to vibrate the proof mass when compared to dual proof mass devices. Not only is there less mass to move but there is no need for mechanical phase controlling linkages between separate proof masses.

There are important performance benefits that stem from a single proof mass design. These are related to the improved symmetry that can be achieved for differential, dual mode operation. In particular, measurement errors related to differences in proof mass temperature, vibration, and alignment do not occur in a single proof mass device since these differences do not exist.

2. Simplified Compact Design

The complexity of the suspension system shown in FIG. 1 differs from earlier approaches in the number and shape of the flexures needed to control proof mass and resonator motion. The MAC sensor uses fewer flexures and does not require the high aspect etching techniques needed to fabricate flexures that are long and narrow. As a result, the number of lithography masks and the difficulty of the micromachining process is reduced. The use of wide, short flexures also increases the strength of the structure since material stresses are reduced for these geometries.

Another benefit of the MAC design is a simplification of the vibrational modes inherent in the structure. The reduction in number and complexity of the various flexures reduces the number and increases the frequency separation of unwanted, parasitic modes. This reduces the effort needed to design the structure and improves the overall measurement performance.

3. Perpendicular Dither Motion

The first embodiment of the MAC sensor differs from earlier devices in that the dither motion of the proof mass is perpendicular to the wafer surface instead of parallel. This allows for greater precision in alignment of the forces that produce the dither motion and in the flexure structures that control this motion.

Alternate approaches rely upon external parts, such as magnets and pole pieces, that can effect the alignment of in-plane dither forces. These external parts are sensitive to their mounting structures and can shift or change due to handling and aging of the overall sensor assembly. These effects are reduced in the MAC geometry since the electrostatic plates that determine the perpendicular dither forces are an integral part of each MAC sensor chip.

Another advantage of perpendicular motion relates to the isolation of orthogonal modes of vibration. The frequency of the proof mass in the perpendicular direction is much lower than the in-plane directions. This means the isolation of these modes and the ability to eliminate unwanted in-plane dither motion is improved.

4. Adjustable Electrostatic Drive Frequencies

Both the proof mass and resonators use electrostatic fields to produce their vibrational motion. Since the exact frequency of an electrostatic resonator can be adjusted by application of an external DC bias in these fields, it is possible to fine tune the proof mass and resonator frequencies after the sensor chip has been fabricated. This means that slight variations in frequency or electronic response caused by manufacturing tolerances can be corrected after fabrication. This is done by adjusting the DC biases applied to the MAC chips by its external electronics.

IV. Alternate Configurations of the First Embodiment

Outlined below are several alternative configurations of the first embodiment of the MAC sensor.

A. All Silicon Sensor Assembly

The MAC sensor can be made from materials that are different than described above. In particular, the Pyrex caps 24 and 25 could be made from silicon. This would reduce the residual stresses caused by differences in thermal expansion between Pyrex and silicon. While the use of silicon caps might make the bonding and inspection of the chip more complicated, the design is compatible with both materials and final material selection may be dependent on the applications for which the chips is designed.

B. Single Axis Sensor

It is possible for the MAC chip to measure linear and angular motions separately and to use the device as an individual accelerometer or Coriolis rotation sensor. Since the ability to measure linear acceleration is effected by the rotational measurement, it is possible to optimize the measurement of one quantity at the expense of the other. This device is compatible with those applications where separate acceleration and rotation sensors of better performance are beneficial.

C. Four Axis Monolithic Sensor

Figure 4A:
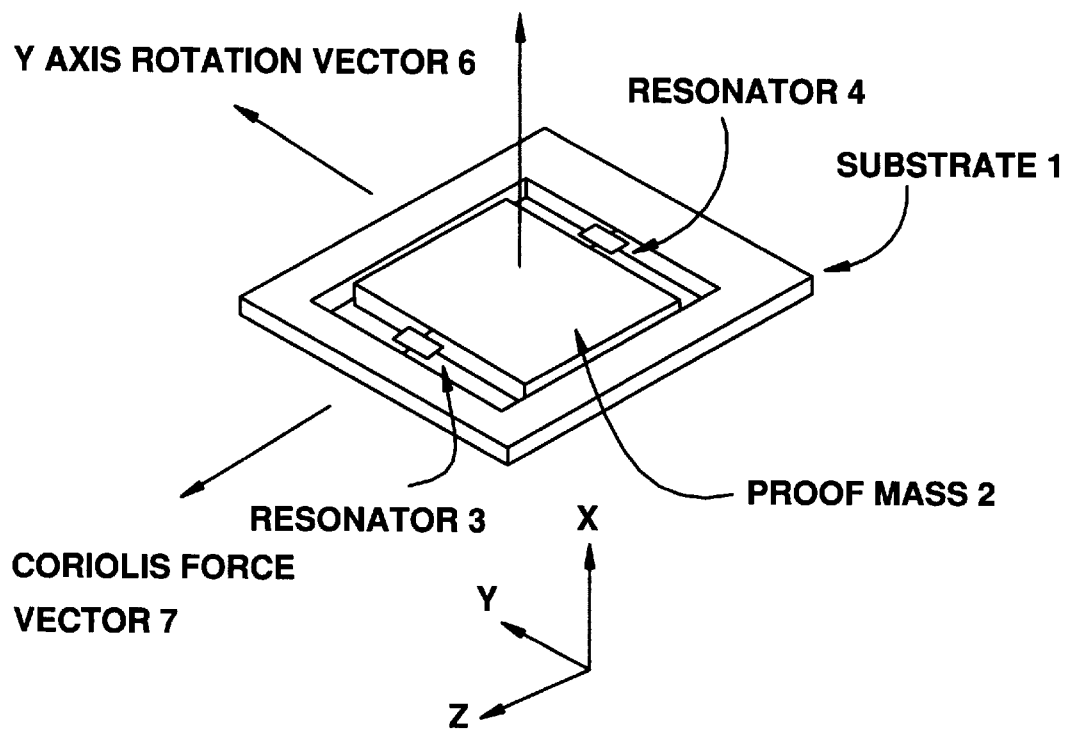
FIG. 4A is a top perspective view of a monolithic electromechanical structure of a four axis solid state silicon micromachined acceleration and Coriolis (MAC) sensor according to an alternate configuration of a first embodiment of the present invention.
Figure 4B:
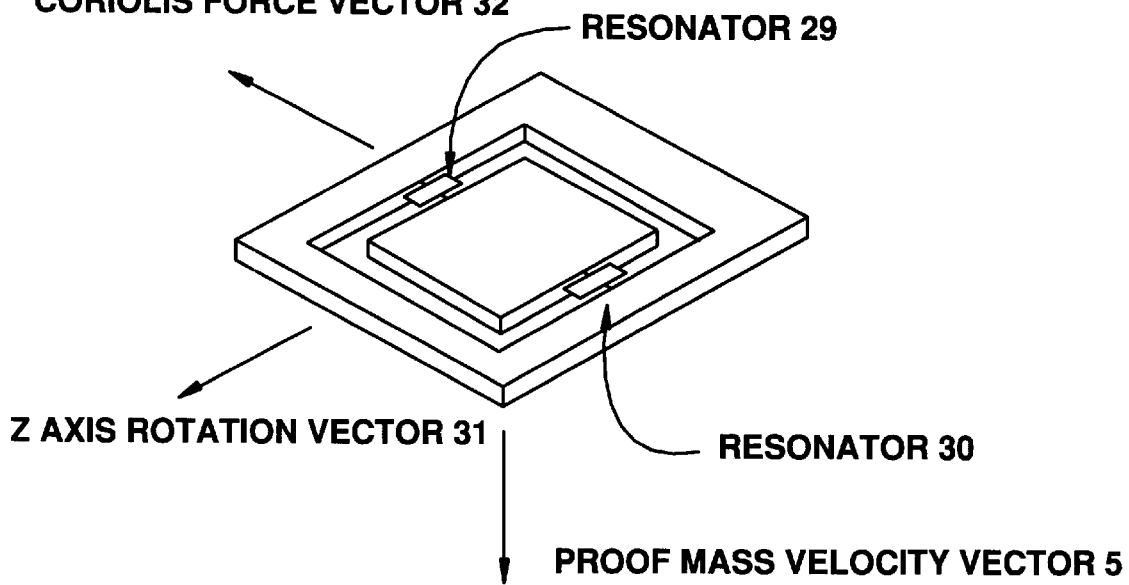
FIG. 4B is a bottom perspective view of the monolithic electromechanical structure shown in FIG. 4A.

The sensor geometry shown in FIG. 1 can be modified to produce a four axis sensor as shown in FIG. 4. Such a sensor has the flexures 8, 9, 10 and 11 as shown in FIG. 1 replaced with additional resonators 29 and 30. It can be seen from the symmetry of the chip that these additional resonators would exhibit a measurement capability for linear accelerations in the y axis and rotational velocities along the z axis. In this embodiment, one chip would function as two accelerometers and two rotation sensors for those applications where this would be beneficial.

D. Six Axis Monolithic Sensor

Figure 5A:
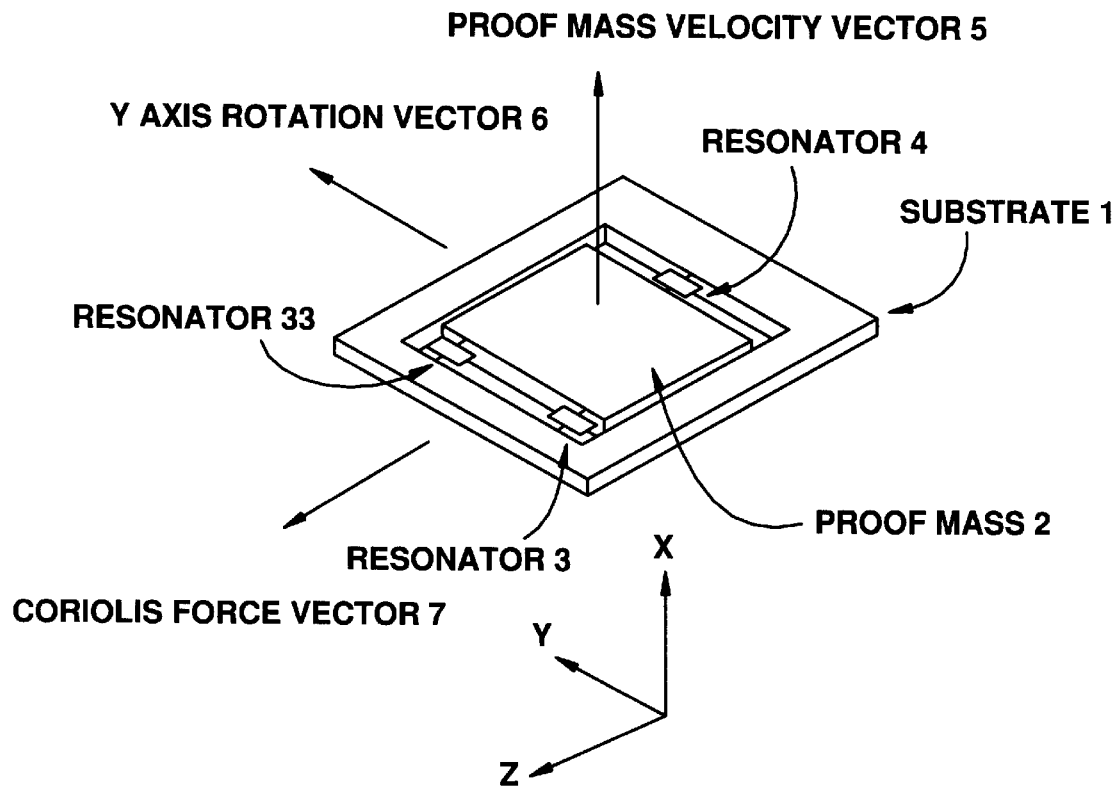
FIG. 5A is a top perspective view of a monolithic electromechanical structure of a six axis solid state silicon micromachined acceleration and Coriolis (MAC) sensor according to another alternate configuration of the first embodiment of the present invention.
Figure 5B:
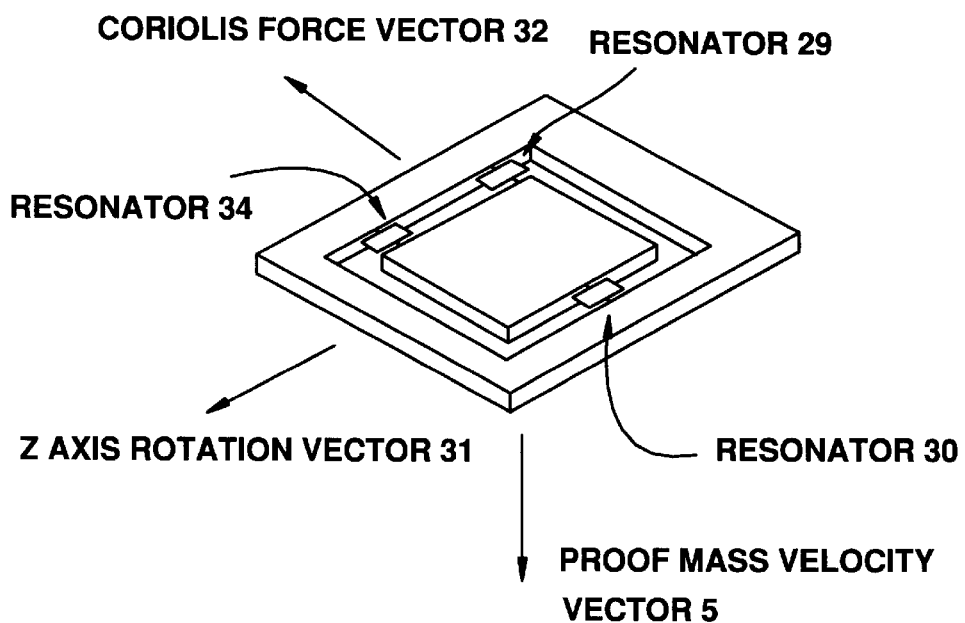
FIG. 5B is a bottom perspective view of the monolithic electromechanical structure shown in FIG. 5A.

The MAC sensor could operate as a complete six axis sensor if modified as shown in FIG. 5. This arrangement is similar to that shown in FIG. 4 with the addition of new resonators 33 and 34. These resonators have been positioned so that rotational acceleration about the x axis can be measured.

In particular, a rotational acceleration about the x axis would add a tensile stress to resonator 3 while producing a compressive stress in resonator 33. This rotational acceleration could be measured by taking the difference in the frequencies of these two resonators using the signal processing techniques discussed above. Measuring the frequency difference between resonators 29 and 34 would add to the sensitivity of this measurement and contribute to the rejection of errors common to this mode of measurement.

Measurements of linear acceleration along the x axis can be obtained by making precise measurements of the proof mass dither signal. If a DC bias voltage is applied between the proof mass electrodes on the chip caps 24 and 25, the average frequency of the proof mass becomes dependent on the proof mass's equilibrium position. Since this equilibrium position is effected by forces applied in the x direction, the linear acceleration along the x axis can be determined from the average proof mass frequency. In other words, measuring the reference frequency 19 coming from the proof mass oscillator 12 can determine the linear acceleration in the x direction.

V. Mechanical Design of a Second Embodiment

In a second embodiment of the present invention, a micromachined sensor is provided for measuring linear and angular motion.

In one particular configuration, the sensor comprises a generally planar substrate, excitation means for vibrating the proof mass at a dither frequency, sensing means for sensing the vibration of the resonators, and means for mounting the excitation means and the sensing means adjacent the proof mass.

The generally planar substrate is generally aligned in a wafer plane defined by a first axis and a second axis, wherein the second axis is orthogonal to the first axis, wherein the substrate is generally perpendicular to a third axis which is orthogonal to the wafer plane. The substrate is formed to include: a frame or frame-like main body portion having an inner cavity; a proof mass disposed in the inner cavity, the proof mass having a top surface and a bottom surface; a flexural support means for connecting the proof mass to the frame and suspending the proof mass within the cavity; and a plurality of resonators, including at least two opposite resonators which are disposed on opposite sides of the proof mass.

The proof mass is capable of vibrating outside the wafer plane, and is capable of applying linear acceleration and rotational Coriolis forces, or displacements caused thereby, to the resonators in response to the linear and angular motion of the sensor.

The plurality of resonators may include at least two offset resonators which are disposed on different planes, the different planes being generally parallel to the wafer plane. The plurality of resonators may include at least two coplanar resonators.

The linear movement of the sensor along the third axis causes the proof mass to modulate the resonant frequencies of the resonators, wherein the vibration frequency around the natural resonant frequency of one of the resonators increases while the vibration frequency around the natural resonant frequency of an opposite resonator decreases, and wherein the difference in vibrational frequency around the natural resonant frequency between the resonators is proportional to the translation of the sensor along the third axis.

The rotational movement of the sensor about the third axis creates Coriolis forces which induce an oscillating torque on the proof mass about the first axis, thereby causing the proof mass to modulate the frequency of the resonators, wherein the vibration frequency of a first resonator is increased while the vibration frequency of a second resonator decreases, wherein the difference in vibration frequency of the first and second resonators is proportional to the rotation rate of the sensor about the third axis.

The means for vibrating the proof mass may include means for rotationally dithering the proof mass about the second axis at the dither frequency.

The plurality of resonators may further comprise a first resonator disposed proximate the top surface of the proof mass and generally along the second axis, and a second resonator disposed proximate the bottom surface of the proof mass and generally along the second axis.

The natural resonant frequencies of the resonators may be substantially equal.

The mounting means may include a pair of caps, each cap having an inner surface and an outer surface, wherein the inner surface is provided with a well or recess, wherein the generally planar substrate is disposed between the caps and attached thereto, and wherein the wells are adapted to allow the proof mass to vibrate outside the wafer plane.

The means for vibrating the proof mass may further include: a plurality of electrodes disposed in at least one of the wells and adjacent the proof mass, the plurality of electrodes including at least one proof mass driver electrode for providing electrostatic forces to the proof mass thereby causing the proof mass to vibrate at the dither frequency; electronic circuitry, connected to the plurality of electrodes, for exciting the plurality of electrodes and for sensing modulations in the vibration frequency of the plurality of resonators caused by the linear acceleration and rotational Coriolis forces so as to produce acceleration and rotation signals indicative of the linear and angular motion of the sensor; and means for connecting the electronic circuitry to the plurality of electrodes.

The plurality of electrodes may further comprise a plurality of proof mass balance electrodes. The balance electrodes may further comprise a plurality of diagonal balance electrodes.

The sensor may also include means for damping proof mass resonance about the first axis in order to improve dynamic response. The proof mass resonance damping means may include means for applying an oscillating voltage to the electrodes.

The driver electrodes rotationally dither the proof mass about the second axis at the dither frequency.

The means for connecting the electronic circuitry to the plurality of electrodes may further include at least one electroplated feedthrough hole disposed through at least one of the caps, wherein the feedthrough hole is adapted to supply electrical energy to the electrodes.

At least one of the resonators may be a cantilever beam having a proximal end attached to the proof mass and a free distal end extending into the cavity.

The vibration frequency corresponding to the linear movement is modulated about a frequency which differs from the dither frequency.

The sensor may further include means for decoupling the resonator modes of opposed the resonators.

At least two of the resonators may have a frequency mismatch.

The sensor may be adapted to exhibit a diagonal inertia tensor, equal rotational frequencies.

The flexural support means may further include a first plurality of opposed flexural supports generally disposed in a first plane, wherein the first plane is generally parallel to the wafer plane.

The flexural support means may further comprise a second plurality of opposed flexural supports generally disposed in a second plane, wherein the second plane is generally parallel to the wafer plane, and wherein the second plane is offset from the first plane.

The flexural support means may further comprise a plurality of diagonally opposed flexural supports. In one particular arrangement, the diagonally opposed flexural supports total four supports. In another particular arrangement, the diagonally opposed flexural supports total eight supports.

The diagonally opposed flexural supports may be coplanar.

The sensor may include at least one body attached to the proof mass, whereby the mass and at least one moment of inertia of the proof mass is increased. The body may be bonded to the proof mass. The body may comprise at least two opposing bodies attached to opposite sides of the proof mass. In a particular arrangement, the body is generally spherical. The means for mounting the excitation means and the sensing means adjacent the proof mass may further include at least one throughhole adapted to allow at least a portion of the body to extend therethrough.

The electronic circuitry may include a proof mass oscillator for exciting the proof mass through the plurality of electrodes. The proof mass oscillator may sense the first natural resonant frequency of the proof mass and provide a reference frequency output relating thereto.

The electronic circuitry may also include resonator oscillator means for exciting the resonators. The resonator oscillator means sense modulations in the plurality of resonators and provides frequency modulated outputs related thereto.

The electronic circuitry may further comprises demodulators for processing the frequency modulated outputs and for providing linear acceleration signals and rotational velocity signals.

The electronic circuitry may further comprise a differential synchronous detector for processing the rotational velocity signals and for providing differential rotational velocity signals.

Furthermore, the electronic circuitry may include a differential frequency counter for processing the linear acceleration signals and for providing differential linear acceleration signals.

The major elements of a particularly preferred second embodiment of a device 50 according to the present invention are shown in FIGS. 6–10 and includes a monolithic electromechanical structure that performs all the sensor's mechanical functions. The structure includes a frame or frame-like main body portion or a frame-like substrate 52, a vibrating proof mass 54, two flexural resonators 56, and a set of flexural supports 58. The present invention may be embodied in various sensor configurations. The structure is referenced to the right handed xyz coordinate system shown in FIG. 10. The linear and rotational sensitivities of the sensor are parallel to the z-axis and perpendicular to the wafer plane. Nomenclature for the second embodiment can be found in Table 2.

TABLE 2

NOMENCLATURE FOR THE SECOND EMBODIMENT

| | |
|---|---|
| A | = electrode area |
| $A_r$ | = resonator electrode area |
| a | = proof mass length (y direction) |
| $a_z$ | = acceleration (z direction) |
| $a_{zmax}$ | = maximum acceleration (z direction) |
| b | = proof mass width (x direction) |
| $b_f$ | = flexure width |
| $b_r$ | = resonator width |
| c | = proof mass thickness |
| E | = silicon modulus of elasticity |
| $\epsilon_0$ | = dielectric coefficient |
| $F_{pm}$ | = force on proof mass |
| $f_{bw}$ | = bandwidth |
| $f_x$ | = proof mass frequency about x axis |
| $f_y$ | = proof mass frequency about y axis |
| $f_z$ | = proof mass frequency about z axis |
| $G_d$ | = gap at dither drive electrodes |
| $\Gamma$ | = moment of inertia ratio |
| $I_x$ | = moment of inertia about x axis |
| $I_y$ | = moment of inertia about y axis |
| $I_z$ | = moment of inertia about z axis |
| $k_{fz}$ | = flexure stiffness in z direction |
| $l_f$ | = flexure length |
| $l_r$ | = resonator length |
| $m_{bb}$ | = mass of bottom proof mass ball |
| $m_{bt}$ | = mass of top proof mass ball |
| $m_{pm}$ | = mass of proof mass |
| $m_r$ | = effective mass of resonator |
| n | = number of flexures |
| $o_x$ | = flexure separation along x axis |
| $o_y$ | = flexure separation along y axis |
| $\Omega_z$ | = angular rotation rate about z axis |
| $\omega_z$ | = linear proof mass frequency along z axis (rad/sec) |
| $\omega_x$ | = angular proof mass frequency about x axis (rad/sec) |
| $\omega_y$ | = angular proof mass frequency about y axis (rad/sec) |
| $Q_x$ | = proof mass resonance Q about x axis |
| $Q_y$ | = proof mass resonance Q about y axis |
| $r_t$ | = radius of top ball |
| $r_b$ | = radius of bottom ball |
| $\rho b$ | = ball density |
| $\rho pm$ | = proof mass density |
| $\rho r$ | = resonator density |
| s | = proof mass electrode moment arm |
| $t_f$ | = flexure thickness |
| $t_r$ | = resonator thickness |
| $\theta_x$ | = proof mass rotation about output x axis |
| $\theta_y$ | = proof mass dither rotation about y axis |

TABLE 2-continued

NOMENCLATURE FOR THE SECOND EMBODIMENT

| | |
|---|---|
| $V_d$ | = proof mass dither drive voltage |
| $V_0$ | = electrode bias voltage |
| $Z_d$ | = proof mass dither displacement |
| $Z_0$ | = proof mass Coriolis displacement at resonator |
| $Z_{pm}$ | = proof mass linear displacement |

As best seen in FIGS. 6–9, the micromachined silicon wafer is preferably bonded to two Pyrex glass or silicon caps 60. Both of these caps 60 have proof mass wells or recesses 62 that are etched into the caps' surfaces. These wells 62 are recessed an amount sufficient to allow for the vibrational motion of the proof mass 54 perpendicular to the xy plane. The wells 62 also contain metallic electrode patterns or drive and balancing electrodes 64 that are used to vibrate the proof mass 54 and the resonators 56. Electroplated feedthrough holes 66 are formed in the caps 60 to make electrical contact to the inside of the chip. These feedthroughs 66 have topside electrode patterns that can be used for wire bonding. For example, an upper Pyrex cap may support upper electrodes and input/output wire bonding pads 68, a lower Pyrex cap may support lower electrodes and chip mounting surfaces, and a wafer or silicon layer may contain accelerometer and gyro structures.

A. Chip Design

The proof mass 54 consists of a central plate 70 of single crystal silicon that is bonded to two precision silicon nitride spheres 72, which is unique to the second embodiment of the present invention and is a critical fabrication step in producing this type of sensor. These spheres 72 offer several benefits, including up to at least a twenty-five times increase in the rotational sensitivity of the structure because the microspheres add structural height to the silicon wafer 70, thereby improving its moment of inertia properties. These microspheres 72 also add additional mass to the proof mass 54 which increases the overall accelerometer sensitivity. The microspheres 72 may be attached by bonding techniques similar to surface mount die bonding and indium compression seals, or by both compression and solder-based bonding. The central plate 70 may be provided with a microsphere alignment recess 74 to facilitate placement of each sphere 72.

Another critical fabrication process step deals with the balancing of the proof mass assembly after sensor fabrication. Since the device 50 is a coupled, dual-mode Coriolis sensor, it is sensitive to cross-axis proof mass motions that occur in unbalanced vibrating systems. In particular, variations in the mass/stiffness symmetry of the device 50 can contribute to the bias of the rotational velocity measurements. While these variations are impossible to eliminate in any real physical system, they can be minimized by adjusting the mass distribution of the proof mass 54. This can be accomplished by laser trimming mass from flexures, the proof mass, and the silicon nitride microspheres. These spheres 72 are directly accessible through central holes 76 in the top and bottom caps 60 and can be adjusted to improve the static and dynamic balance of the proof mass 54. Additional adjustments to the sensor's balance are made after laser trimming by controlling the electrostatic bias voltages applied to the metallic electrodes 64 mounted above and below the proof mass 54. This two step method of controlling proof mass balance will significantly reduce the cross axis coupling that ultimately contributes to measurement bias.

More than one micromachined sensor may be fabricated simultaneously on a single crystal silicon wafer. The wafer is fabricated using bulk micromachining techniques. After heavy p-type diffusion (later used as a substrate contact), a deep anisotropic etch from the frontside is used to set the resonator 56 and flexure 58 thickness on the bottom surface to between 10 and 20 microns. A second anisotropic etch from the backside likewise sets the thickness of the frontside resonator 56 and flexures 58. Isotropic plasma etches are then used to form the resonator and flexure shapes from the diaphragm regions left by the deep etches and to free the proof mass 70 from the frame 52. The single crystal silicon wafer is subsequently bonded to two Pyrex cap wafers 60 to form a three part sandwich assembly. Recesses 76 are formed in the Pyrex caps using hydrofluoric acid and gold electrodes are sputtered, patterned, and etched. This metalization forms the substrate contacts during anodic bonding as well as the electrode patterns used to drive and sense resonator motion. Since the metal traces run entirely on the glass surface, any stray capacitance between traces and to the substrate are minimized.

The anodically bonded three layer sandwich assembly is then diced into the individual microchips. Each chip contains all the mechanical parts needed for a complete sensor stage. These chips are then assembled along with their associated electronics into sensor packages. A six degree of freedom inertial measurement unit is comprised of three chips with their support electronics. The chips are oriented in a way for each of three orthogonal axes of rotation and acceleration to have a non-zero projection onto at least one of the sensing axes of the chips.

Referring to FIGS. 7–9, one particular embodiment of the present invention was constructed having a 10 mm width, 10 mm length, and 1.5 mm depth wherein the spacing 80 between feedthrough holes or corresponding bond pads was 2.54 mm, and further included two 1.0 mm diam-gold plated silicon nitride spheres.

FIG. 10 shows two spheres attached to a proof mass means having a plurality of flexures and resonators, illustrated without attachment to the remainder of the substrate or the caps.

VI. Principles of Operation of the Second Embodiment

The sensor of the second embodiment of the present invention is a highly integrated device that provides for the simultaneous, differential measurement of linear and rotational motion using only one monolithic proof mass 54. This multiplicity of functions is achieved by controlling and monitoring several different modes of proof mass motion simultaneously. To explain the sensor's operation, the effects of linear and rotational motions on the proof mass will be described separately.

A. Linear Acceleration

The prime function of the proof mass 54 is to generate microscopic motions that are related to the inertial motion of the sensor and can be sensed by the resonators 56.

Figure 11:
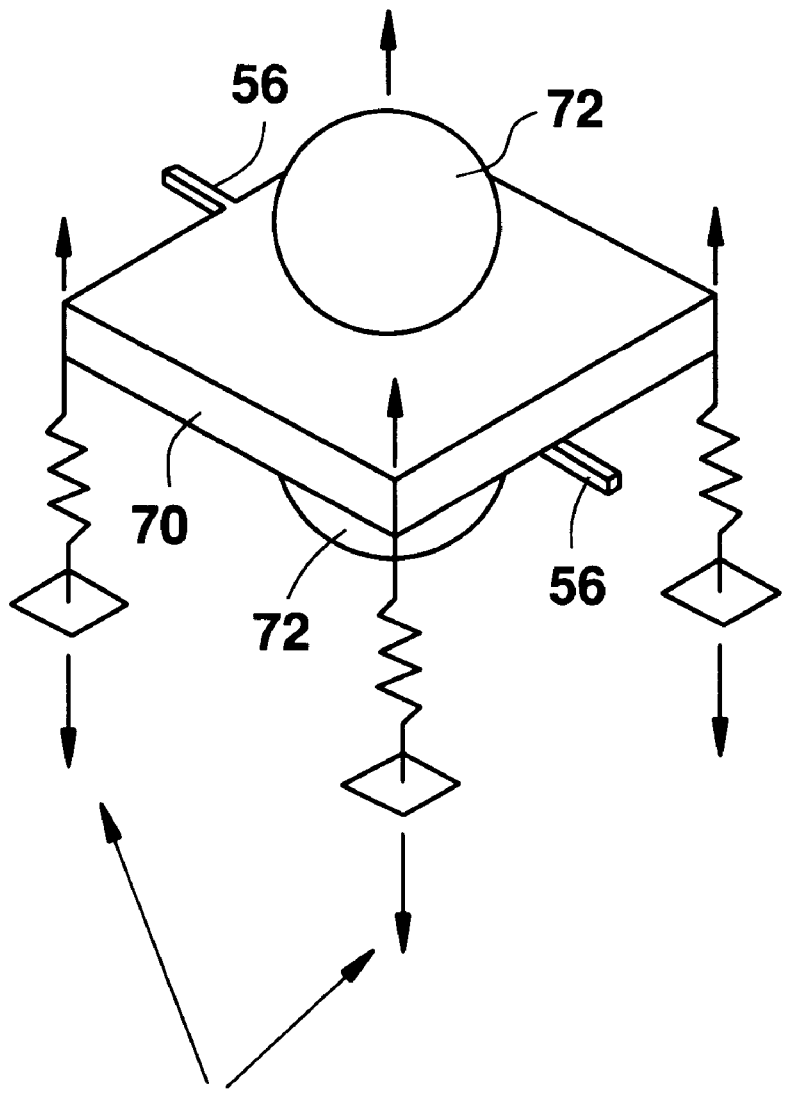
FIG. 11 illustrates the forces and counterforces produced by linear acceleration of the sensor in the z direction.

One of these motions is produced by acceleration in the z direction as shown in FIG. 11 by the simplified illustration of a proof mass including two spheres and two resonators. When the substrate is accelerated along this axis, the inertia of the proof mass 54 produces a counterforce that moves the proof mass in the z direction.

In one particular embodiment, for example, changes in proof mass frequency due to such acceleration may be approximately 2000 Hz.

It is shown herein that the resonant frequency of the sensor's resonator is modulated by small changes in the position of the proof mass 54. As a result, both resonators 56 will change their resonant frequency as the proof mass 54 moves. The resonators 56 are positioned on opposite surfaces of the proof mass 54 so that a motion of the proof mass in the positive z direction (FIG. 10) will cause one resonator to increase its frequency while the frequency of the other resonator will decrease. These changes in resonant frequency will occur at the same rate as the applied acceleration and will be proportional to the magnitude of this acceleration. In one particular example, one resonator will exhibit a change in frequency of about 2 kHz relative to its natural resonant frequency of 100 kHz when subjected to an acceleration of 50 g.

The measurement of this acceleration is completed by subtracting the frequency of one resonator from the frequency of the second resonator and multiplying by a constant, predetermined scale factor. For example, a 50 g acceleration may produce a total dual-stage differential frequency change of more than 4 kHz. This simple operation provides a sensor output that is highly linear and relatively free of common mode measurement errors caused by temperature, aging, and electronic voltage drift.

B. Rotational Velocity

Figure 12:
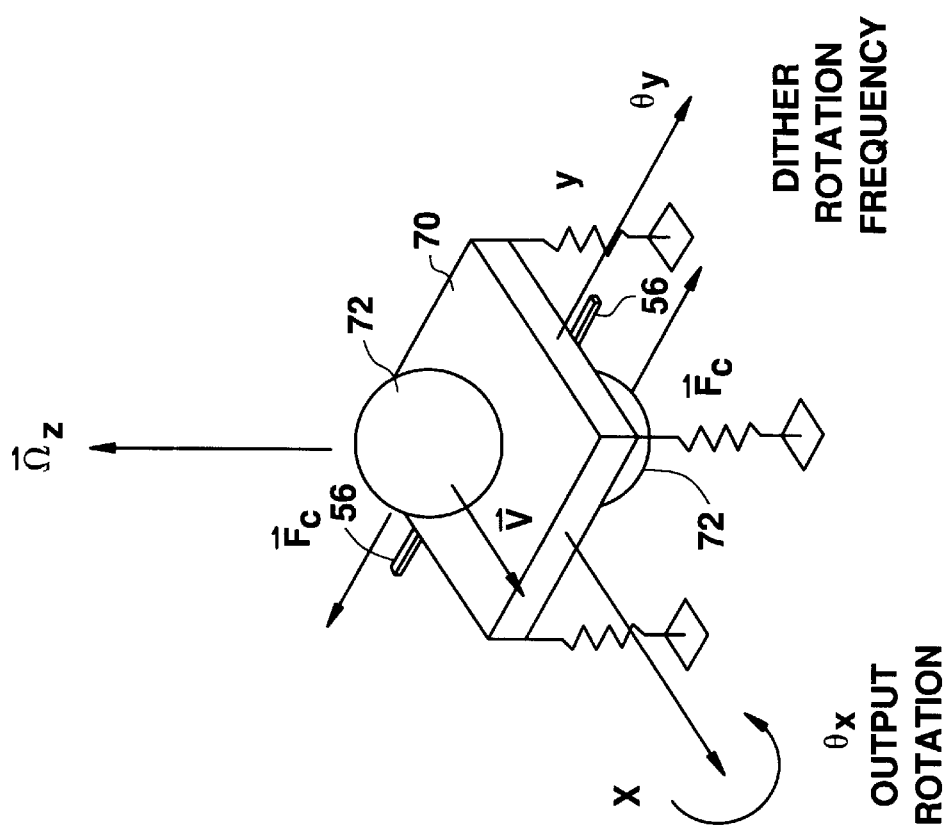
FIG. 12 illustrates the oscillating torque about the x axis created by Coriolis forces produced by vibration of the proof mass about the y axis and sensor substrate rotations about the z axis.

The Coriolis "force" is actually an apparent acceleration attributed to a body that is in motion with respect to a rotating coordinate system. If the proof mass is vibrated about the y axis in the simplified illustration of FIG. 12 and, if the sensor substrate is rotating about the z axis, then Coriolis forces will be produced that create an oscillating torque about the x axis. The directions of these various motions, forces, and torques are shown in FIG. 12.

The Coriolis forces oscillate at the frequency of the proof mass y-rotation. This motion is called the proof mass "dither". The torque that is created by the Coriolis forces also oscillates at the dither frequency and produces a vibration about the proof mass' x axis that is proportional to the rotation of the sensor about the z axis. This x axis motion is detected by the sensor resonators using the same positional sensitivities that enabled the detection of the linear z axis motion. In particular, small changes in the proof mass angle about the x axis produce changes in the resonant frequencies of the resonators. These changes occur at the frequency of the dither motion and, therefore, produce a frequency modulation of the resonators. The magnitude of this modulation is proportional to the z axis angular velocity. In one particular example, the magnitude of the modulation was about 400 Hz at each resonator when the sensor was subjected to a rotation of 1,200°/s.

The feature of the Coriolis motion that distinguishes it from the linear motion is its frequency. Since the Coriolis forces oscillate at the dither frequency, they can be demodulated electronically to isolate this signal from the lower frequency acceleration signal. The details of this demodulation are described below. The phase of one of the demodulated output signals is shifted by 180° to create a differential, dual-stage output for the rotational measurements that provides the same benefits attributed to the linear acceleration measurements.

C. Temperature

The temperature of the sensor can also be obtained from its resonator output frequencies. This is accomplished by adding the carrier frequencies of each resonator and multiplying by the appropriate scale factor.

VII. Unique Features of the Second Embodiment

The present invention offers a unique design that has several inherent advantages. Advantageous features stem from the geometry of the suspension system used to support the proof mass and the use of vibrating resonator beams to detect proof mass motion.

1. Single Proof Mass Design

The fact that only one proof mass is needed to produce differential outputs for both linear and rotational measurements offers several benefits. The first is reduction in size of approximately 2 to 1 relative to dual proof mass designs. This not only reduces the size of the final sensor chip but also increases the number of chips that can be arranged on a single fabrication wafer. This last effect can greatly reduce the cost of individual chips when produced in large quantities.

The use of only one proof mass also reduces power requirements needed to vibrate the proof mass when compared to dual proof mass devices. Not only is there less mass to move, but there is no need for mechanical phase controlling linkages between separate proof masses.

There are important performance benefits that stem from a single proof mass design. These are related to the improved symmetry that can be achieved for differential, dual mode operation. In particular, measurement errors related to differences in proof mass temperature, resonator nonlinearities, vibration, and alignment do not occur in a single proof mass device as these differences do not exist.

2. Simplified Compact Design

The complexity of the suspension system of the second embodiment shown in FIGS. 6–10 differs from other approaches in the number and shape of the flexures needed to control proof mass and resonator motion. The sensor uses fewer flexures and does not require the high aspect etching techniques needed to fabricate flexures that are long and narrow. As a result, the number of lithography masks and the difficulty of the micromachining process are reduced. The use of wide, short flexures also increases the strength of the structure since material stresses are reduced for these geometries.

Another benefit of the present design is simplification of the vibrational modes inherent in the structure. The reduction in number and complexity of the various flexures reduces the number and increases the frequency separation of unwanted, parasitic modes. This reduces the effort needed to design the structure and improves the overall measurement performance.

3. Out-of-Plane Dither Motion

The present invention differs from other devices in that the dither motion of the proof mass is perpendicular to the wafer surface instead of being parallel. This allows for greater precision in alignment of the forces that produce the dither motion and in the flexural support means or flexure structures that control this motion.

Alternate approaches rely upon external parts, such as magnets and pole pieces, that can affect the alignment of in-plane dither forces. These external parts are sensitive to their mounting structures and can shift or change due to handling and aging of the overall sensor assembly. These effects are reduced in the present geometry since the electrostatic plates that determine the perpendicular dither forces are an integral part of each chip.

Another advantage of perpendicular motion relates to the isolation of orthogonal modes of vibration. The frequency of the proof mass in the perpendicular direction is much lower than the frequencies in the in-plane directions. This means the isolation of these modes and the ability to eliminate unwanted in-plane dither motion is improved.

4. Adjustable Electrostatic Drive Frequencies

Both the proof mass and resonators use electrostatic fields to produce their vibrational motion. Since the exact frequency of an electrostatic resonator can be adjusted by the application of an external dc bias in these fields, it is possible to fine-tune the proof mass and resonator frequencies after the sensor chip has been fabricated. This means that slight variations in frequency or electronic response caused by manufacturing tolerances can be corrected after fabrication. This is done by adjusting the dc biases applied to the sensor chips by its external electronics.

VIII. Alternate Configurations of the Second Embodiment

The sensor can be made from materials that are different than those described above. In particular, the Pyrex caps could be made from silicon, which would reduce the residual stresses caused by differences in thermal expansion between Pyrex and silicon. While the use of silicon caps might make the bonding and inspection of the chip more complicated, the design is compatible with both materials, and final material selection may be dependent on the applications for which the chip is designed.

In addition to the embodiment shown in FIGS. 15–18, other embodiments may have the same or similar relative positioning of flexures and resonators, wherein all of those features are disposed in a single plane. It is expected that these other embodiments may not perform as well as those similar to that shown in FIGS. 15–18, however the other embodiments may require substantially fewer fabrication steps and hence lower cost.

IX. Analysis of the Second Embodiment

1. Accelerometer Analysis

Estimates of the accelerometer scale factor can be made by using a simple linear spring mass model. The deflection of the proof mass in the z direction caused by linear acceleration can be calculated using Newton's second law of motion combined with Hooke's law of elasticity.

$$z_{pm} = \frac{F_{pm}}{k_z} = \frac{m_{pm} \cdot a_z}{n \cdot k_{fz}} = \frac{a_z}{\omega_z^2} \quad [37]$$

These equations show that the deflection of the proof mass can be calculated when the resonant frequency of the proof mass is known. The resonant frequency can be calculated from calculated proof mass and flexure dimensions. The maximum deflection of the proof mass, when subjected to a maximum acceleration is, therefore:

$$z_{pm} = \frac{a_{zmax}}{\omega_z^2} \quad [38]$$

This is the maximum deflection that needs to be measured by both resonators when the sensor is subjected to the maximum acceleration. Note that this deflection should be smaller than the resonator's electrode gap.

The change in resonator frequency caused by this deflection is given by:

$$\Delta f_a = \epsilon \cdot f_0 \cdot z_{pm} \quad [39]$$

The natural resonant frequency of a single cantilever beam is determined from:

$$f_o = \frac{t_r}{2 \cdot \pi \cdot l_r^2} \cdot \left(\frac{E}{\rho_r}\right)^{0.5} \quad [40]$$

The gap sensitivity can be calculated from:

$$\epsilon = \frac{6 \cdot \epsilon_0 \cdot A_r \cdot V_{ro}^2}{m_r \cdot (2 \cdot \pi \cdot f_0)^2 \cdot G_r^4} \quad [41]$$

Combining these equations with the estimate of proof mass deflection leads to:

$$\Delta f_a = \epsilon \cdot f_0 \cdot z_{pm} \quad [42]$$

which gives a single stage scale factor of:

$$\text{single stage scale factor} = k_a = \frac{\epsilon \cdot f_0}{\omega_z^2} \quad [43]$$

and a dual-stage scale factor of:

$$\text{dual-stage scale factor} = 2 \cdot k_a \quad [44]$$

2. Gyro Analysis

The response of the gyro channel is determined by calculating the coupling of the y axis dither motion into the x output axis as created by the rotationally induced Coriolis forces. This cross-axis coupling can be visualized using equivalent mass and moment "sphere and stick" model shown in FIG. 13.

Figure 13:
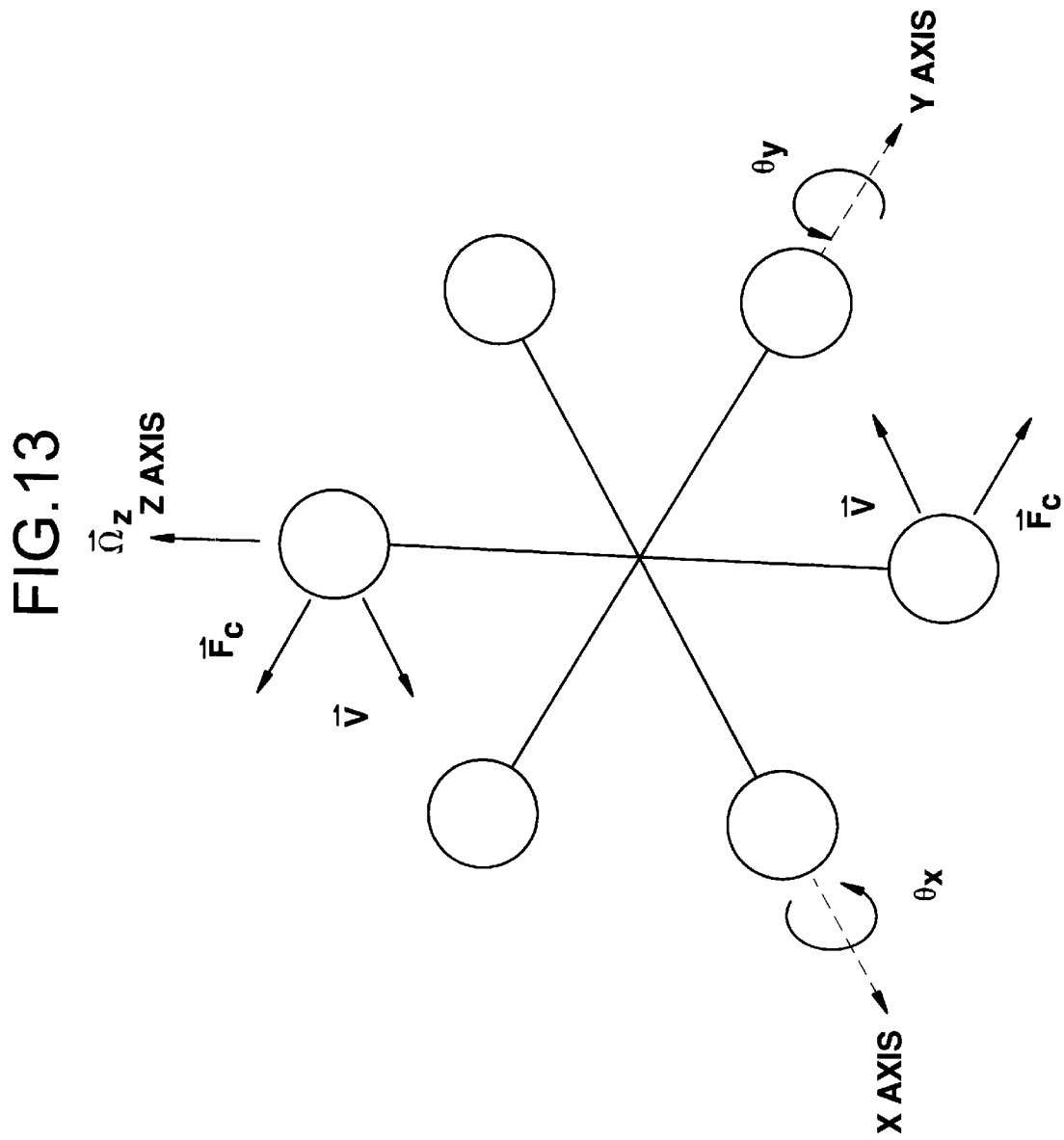
FIG. 13 illustrates cross-axis coupling of the y axis dither motion into the x output axis as created by the rotationally induced Coriolis forces, shown by equivalent mass and moment representation.

FIG. 13 shows how the dither velocity of the z axis spheres, combined with inertial rotation about the z axis, creates a torque about the x axis. This torque produces a rotation about the x axis that is given by $$\theta_x = \Gamma \cdot \frac{Q_x \cdot \Omega_z}{\omega_d} \cdot \theta_y \quad [45]$$

where $$\Gamma = \frac{I_x + I_y - I_z}{I_x} \quad [46]$$

Note that the magnitude of the x axis rotation is proportional to the angular velocity about z. The x axis rotation creates a displacement of the y axis spheres in the z direction. Since the y axis dither motion is a vibration of a given frequency, the resulting output motion is also vibrational at the same frequency. This motion is sensed by the resonators located at the equivalent positions near the ends of the proof mass.

3. Proof Mass Calculations

Equation 45 shows that the ratio of proof mass moments denoted by $\Gamma$ is a critical factor in the cross coupling of resonator modes. Since the angular response of the sensor is proportional to $\Gamma$, it is important to increase the value of this term as much as possible. Analysis of this term shows that its magnitude increases as the height of the proof mass grows in the z direction. This is difficult to accomplish through conventional planar micromachining methods and is the prime reason the precision silicon nitride spheres have been added to the structure in this embodiment.

The value of $\Gamma$ can be calculated from the moments of inertia of the combined double sphere proof mass geometry. Removal of the spheres could reduce the value of $\Gamma$ by two orders of magnitude, e.g. from 1.1 to 0.04. Thus, the spheres contribute significantly to the magnitude of the proof mass mode coupling and can substantially increase the response of the sensor. The double sphere proof mass design is a unique advantage of the present invention.

4. Mode Analysis

A finite element analysis (FEA) was performed for a particular configuration of the second embodiment to characterize the operational modes of the proof mass in order to optimize the linear and rotation rate scale factors and also to identify parasitic modes that could interfere with the operation of the device. By its nature the analysis was iterative. Implicit in an FEA calculation was the computation of the moments of inertia and flexural properties of the silicon struts. The FEA demonstrated that dimensions for the proof mass, resonators, and flexures fully compatible with this fabrication technology do give gyro and accelerometer responses described below. Isolation of parasitics from the operational linear and rotational modes was also demonstrated.

5. Proof Mass Drive and Balance Electrodes

Figure 14:
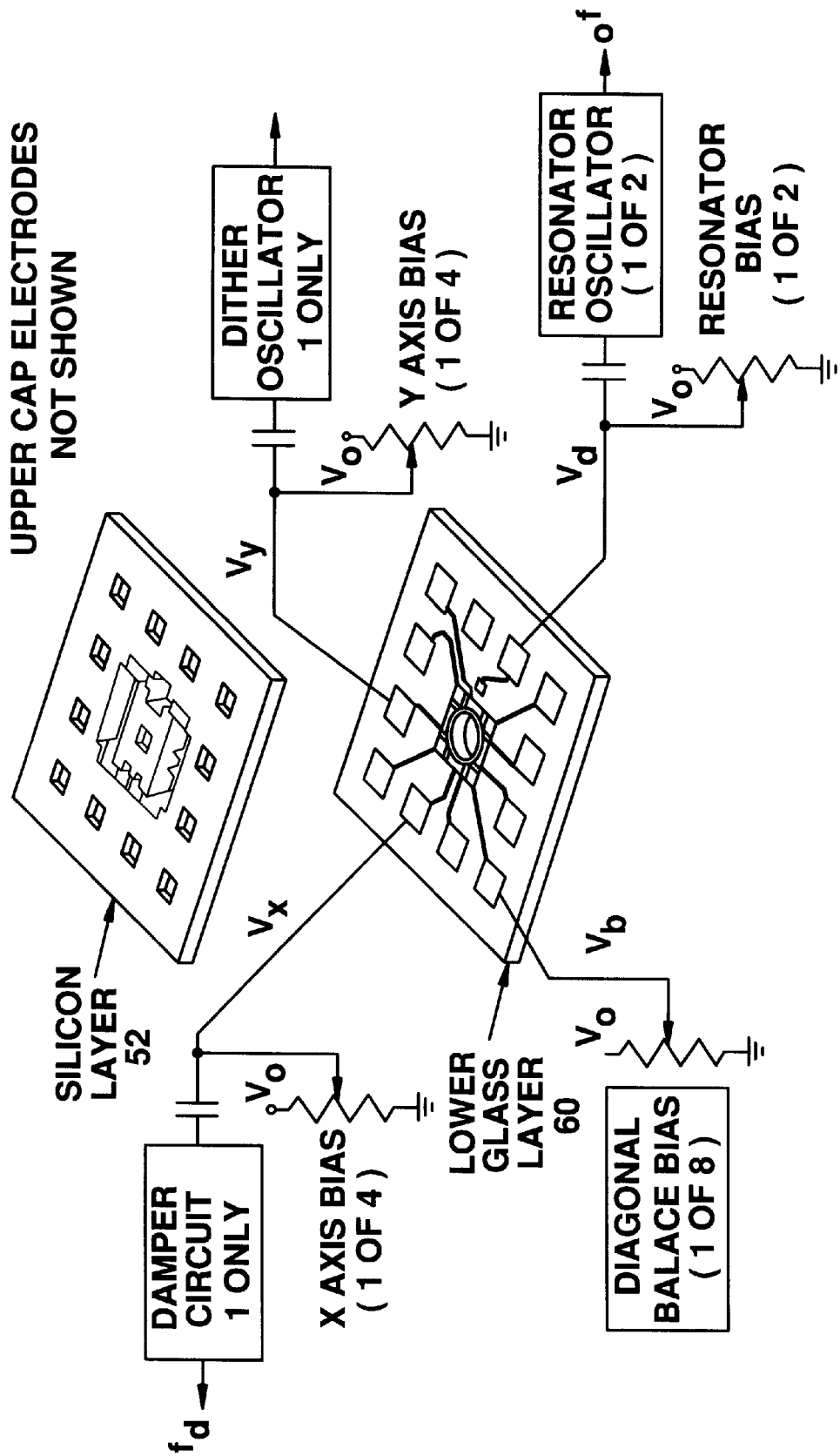
FIG. 14 illustrates a dither drive system for oscillating at the natural resonant frequency of the y axis.

The dither drive system shown in FIG. 14 is designed to oscillate at the natural resonant frequency of the y axis. This becomes the reference frequency for all sensor functions. The resonant frequencies of the y (dither) and x (Coriolis) modes are approximately the same. This near equality enhances the gyro scale factor. However exact equality is not a critical requirement since amplitude and phase variations caused by slight imbalances in these frequencies are accounted for by the sensor electronics. The x axis damping circuit shown in FIG. 14 compensates the sensor for the x axis frequency offsets and provides a reduction in x axis Q needed to maintain the sensor's bandwidth. The details of the sensor's gain/bandwidth trade-offs is described in the section below.

Electrostatic balancing is accomplished by applying biases to the drive electrodes as well as the set of eight diagonal balance electrodes shown in FIG. 14. This array of balancing electrodes is designed to trim out flexural and mass imbalances introduced during the silicon layer fabrication as well as misalignments of the drive electrodes to the proof mass. These imbalances and misalignments could lead to biases that interfere with detection of the inertial signals the sensors are designed to monitor. The goal of electrostatic balancing is to reduce these biases consistent to specifications such as those found in Tables 3 and 4 below.

The biases applied to the dither drive electrodes are used to correct for net stiffness difference between the top and bottom flexures, net stiffness variation that would give a non-zero y-z component to the compliance matrix ($k_{yz}$), and differences in the diagonal compliances that would move the dither and the Coriolis modes off-resonance.

Similarly biases on the x electrodes are used to correct for top to bottom stiffness imbalance and buck out $k_{xz}$ off-diagonal terms. Diagonal balance electrodes trim out $k_{xy}$ and electrode misalignment about the proof mass z-axis.

By way of example, in one particular embodiment of the present invention, a dither drive was set at 28V yielding a Q of 1000 at 75V, a damping drive was set at less than 0.5V yielding a Q of 20 at 75V, a resonator drive was set at approximately 0.05V yielding a Q of 50,000 at 20V, and a balance offset was set at less than 100V, plus or minus 1 micron flexure tolerance.

6. Dither Drive Calculations

Equation 45 shows that the output motion is also proportional to the magnitude of the dither motion. This dither motion is generated using the system shown in FIG. 14. Differential equations of motion that describe the y axis motion of the proof mass (subjected to the dither drive electrostatic forces) show that the magnitude of this motion is:

$$z_d = \frac{2 \cdot b \cdot Q_y \cdot \varepsilon_0 \cdot A \cdot s \cdot V_0 \cdot V_d}{I_y \cdot \omega_y^2 \cdot G_d^2} \quad [47]$$

which is the displacement at the sides of the proof mass.

Since the overall response of the gyro channel is proportional to this displacement, the magnitude of the dither drive is held constant by an automatic gain control loop contained in the dither oscillator. This gain loop accounts for changes in dither drive amplitude created by changes in Q or electronic phase shifts and maintains control of the gyro's output scale factor.

In one particular example, a y axis Q of 1,000 was used to estimate dither deflection, which was conservative relative to typical proof mass Q's of 10,000 and 12,000. If the proof mass exhibits Q's of this magnitude after fabrication, the levels of the dither drive voltages can be reduced accordingly. For reasons relating to sensor bandwidth, it is desirable to limit the $Q_x$ of the x axis rotation. This is done electronically by applying an oscillating voltage to the proof mass electrodes that are symmetrical with the x axis. This oscillating voltage has an amplitude and phase that is proportional to the x axis velocity and, therefore, produces an equivalent damping force that limits the x axis $Q_x$. The generation of this damping voltage is discussed below.

7. Scale Factor/Bandwidth Analysis

The above calculations can be used to evaluate the sensor's rotational scale factor. Equation 45 can be modified to calculate the proof mass deflection at the resonators that is caused by substrate rotation.

$$z_0 = \Gamma \cdot \frac{Q_x}{\omega_d} \cdot \frac{a}{b} \cdot z_d \cdot \Omega_z \quad [48]$$

This can be further modified by the following relationship:

$$\tau = \frac{1}{f_{bw}} = \frac{2 \cdot Q}{\omega_d} \quad [49]$$

to show the explicit relationship between proof mass motion and output bandwidth:

$$z_0 = \Gamma \cdot \frac{1}{2 \cdot f_{bw}} \cdot \frac{a}{b} \cdot z_d \cdot \Omega_z. \quad [50]$$

The proof mass motion $z_0$ modulates the resonators' natural resonant frequencies at the dither drive frequency. Equation 42 can be used to calculate the magnitude of this modulation, or the change in resonator frequency caused by the rotationally induced Coriolis force.

The estimated single-stage rotational scale factor is:

$$k_t = \frac{\Delta f_r}{\text{maximum IMU rate}} \quad [51]$$

A dual-stage scale factor is double the single-stage scale factor. Thus, a magnitude of modulation is achievable which is easily measured by the sensor electronics and provides an angular signal response that is well balanced with respect to the signal response of the acceleration channel. This estimated scale factors response is a critical value used to estimate additional sensor parameters.

Equation 49 can also be used to calculate the $Q_x$ needed to meet scale factor and bandwidth requirements. The proof mass resonance about the x axis is:

$$Q_x = \frac{\pi f_d}{f_{bw}}. \quad [52]$$

Since the bandwidth of the sensor is inversely proportional to Q, the response of the sensor would be reduced in time if $Q_x$ is allowed to reach this value. Although a large Q would increase the magnitude of the sensor's response, the time needed to respond to a given input would also increase. As a result it may be necessary to limit the value of $Q_x$ by providing an electronic damping signal. This signal, generated from amplitude and phase information determined in the sensor's digital signal processing system, is applied to the x axis proof mass plates to add to the coordinate's damping.

X. Performance Estimates of the Second Embodiment

Estimates of the performance of the second embodiment of the present invention constructed according to a particular set of design parameters are shown in Tables 3 and 4. These estimates are based upon data related to one particular set of requirements and upon the above sensor analysis. Of course, other performance values are possible with certain design modifications.

TABLE 3

ACCELEROMETER PARAMETERS

| Accelerometer Parameters | Units | Estimated Sensor Performance |
|---|---|---|
| Bias Stability | micro-g (1 sigma) | 300 |
| Random Walk | m/s/√h | 0.02 |
| Axis Misalignment | micro-rad (1 sigma) | 150 |
| Scale Factor Error | ppm (1 sigma) | 180 |
| Frequency Response | Hz | 300 |
| Linear Range | g | 50 |

TABLE 4

GYRO PARAMETERS

| Parameter | Units | Estimated Sensor Performance |
|---|---|---|
| Bias Drift Rate | °/h (1 sigma) | 1.4 |
| Angle Random Walk | °/√h (1 sigma) | 0.15 |
| Axis Misalignment | micro-rad (1 sigma) | 100 |
| Axis Repeatability | micro-rad (1 sigma) | 170 |
| Scale Factor Error | ppm | 200 |
| Minimum Bandwidth | Hz | 300 |
| Maximum Rate Capability | °/s | ±1,200 |

A good estimate of sensor performance can be obtained by calculating the response of the linear and rotational channels. Once the individual scale factors have been determined, the performance of other sensor parameters can be scaled from the known performance of similar devices.

XI. Resonator Modes

FEA analysis showed a coupling between the two opposed resonators due to the finite mass of the proof mass. This coupling could lead to non-linearities in the gyro and accelerometer scale factors. To avoid this the resonators may be designed with a slight frequency mismatch.

The resonator modes themselves will likely show a statistical spread due to inherent imperfections in the fabrication process. Resonator modes that lie near parasitics will have low Q and not function optimally or at all. For this reason resonators may be designed to position their mode frequencies midway between parasitics, in modal clear windows, in order to maximize die yield on the wafer.

XII. Alternate Sensor Designs for the Second Embodiment

Figure 15:
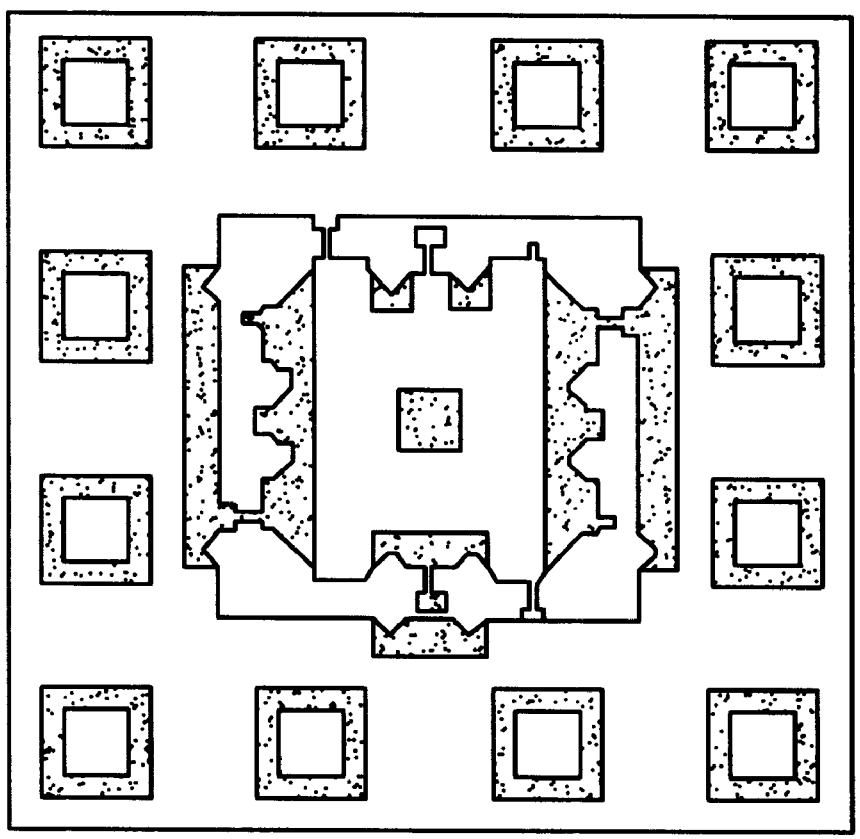
FIG. 15 is a top view of a substrate, having a four flexure/low band resonator configuration, according to the second embodiment of the present invention.
Figure 16:
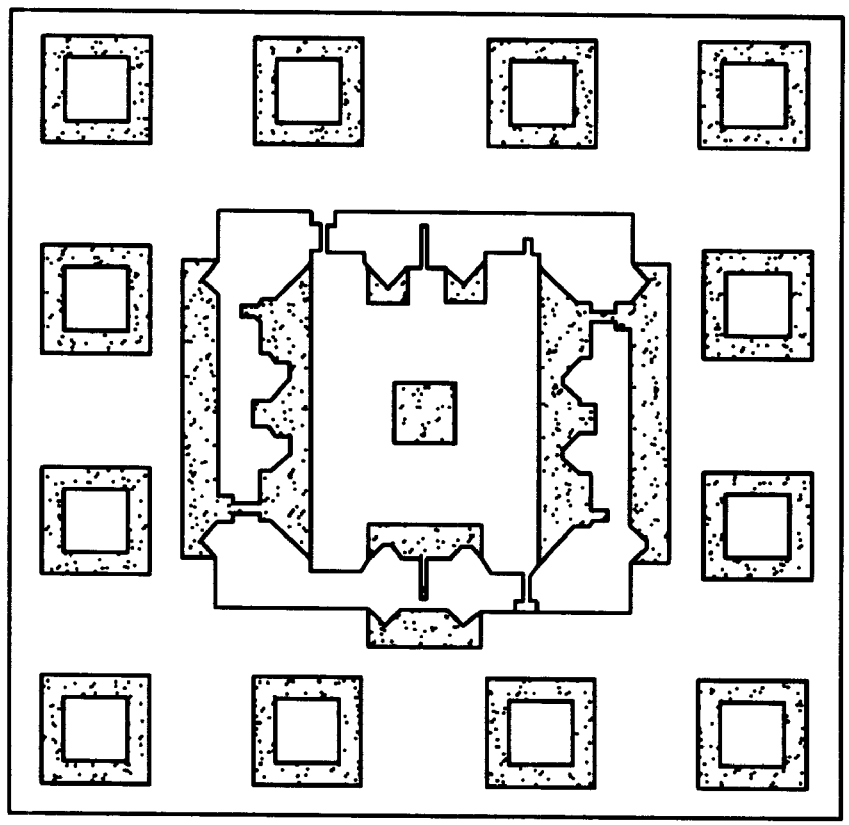
FIG. 16 is a top view of a substrate, having a four flexure/high band resonator configuration, according to the second embodiment of the present invention.
Figure 17:
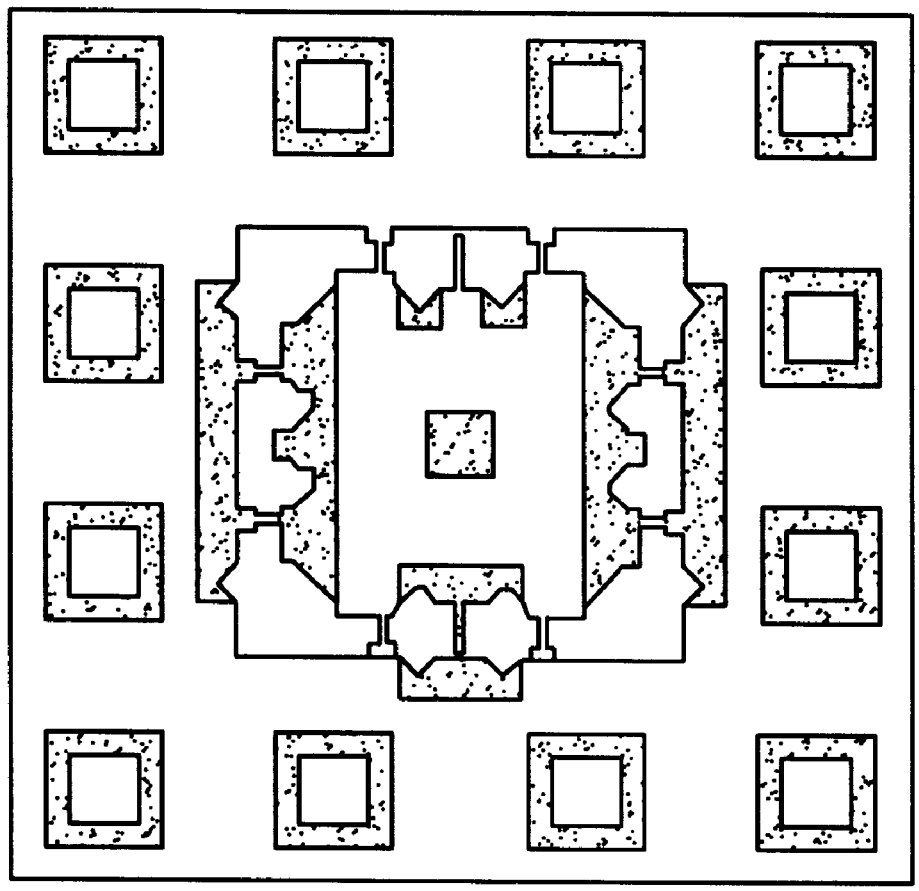
FIG. 17 is a top view of a substrate, having an eight flexure configuration, according to the second embodiment of the present invention.
Figure 18:
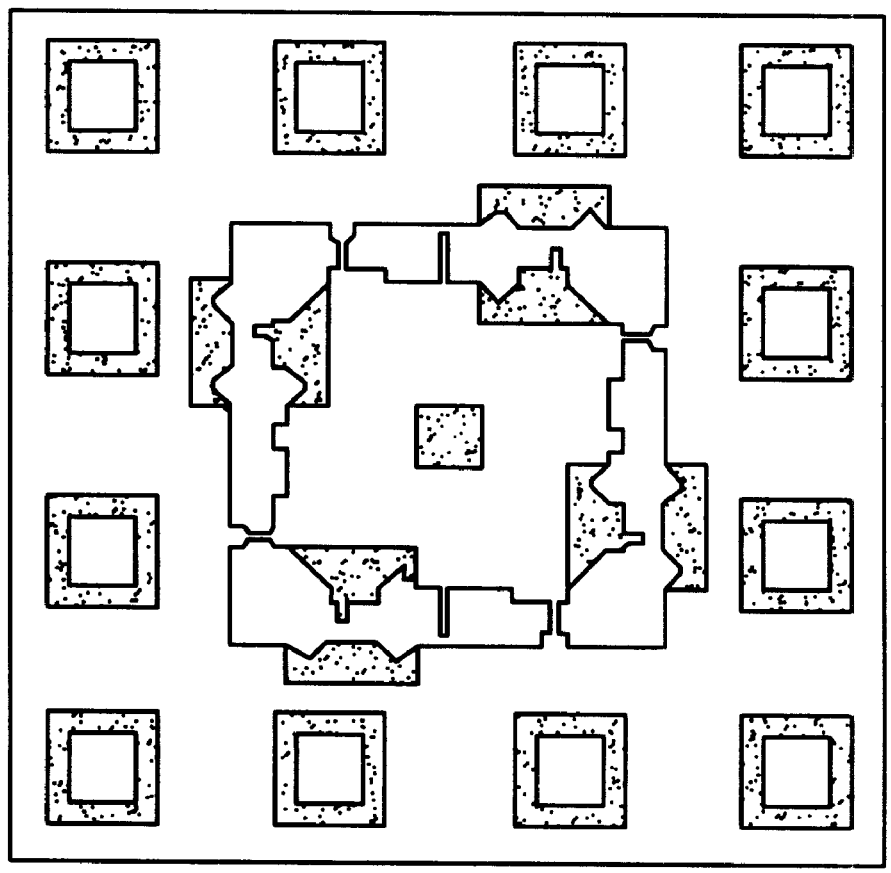
FIG. 18 is a top view of a substrate, having a coplanar flexure/single microsphere configuration, according to the second embodiment of the present invention.

The fabrication process allows variations on the above design to be manufactured on the same wafer. As shown in FIGS. 15–18, the configurations may differ in the details of the resonators and proof mass suspension system. For example, FIGS. 15 and 16 show low and high band resonator variations, respectively. FIG. 17 shows an eight-flexure sensor design. FIG. 18 shows a coplanar flexure/single microsphere sensor.

All four embodiments shown in FIGS. 15–18 exhibit a diagonal inertia tensor, equal rotational frequencies about the x and y axes, and symmetrically patterned electrostatic driver and balance electrodes.

As seen in FIGS. 15, 16 and 18, three of the configurations have four diagonally opposed silicon flexures. This arrangement allows thermal stresses transmitted from the pyrex caps to the flexures to be relieved through a slight rotation of the proof mass perpendicular to the z axis. The rotation gives rise to a temperature dependent gyro bias that can be included in the overall error budget.

An anodically bonded glass-silicon interface may exhibit elastic properties. The eight flexure design illustrated in FIG. 17 should exhibit much greater thermal scale factor and bias sensitivities. The caps may be fabricated on the same wafer, and silicon caps in place of pyrex may reduce the effects of thermal sensitivities in certain embodiments.

The coplanar flexure/single microsphere design of FIG. 18 puts onto the same plane both the principal flexure axes of the suspension system and the center of mass of a proof mass/single microsphere assembly. The two-microsphere, or dual microsphere, designs have the center of mass at the silicon layer mid-plane, causing the flexures to exhibit lateral motion as the proof mass is rocked about x and y. In other words, for the non-coplanar designs, the dither and coriolis rotational modes have a translational component along the x and y-axes, respectively. These translational components may stiffen the mode frequencies and afford an opportunity for the operational modes to couple with higher frequency parasitics. This coupling should be small because of the mode separation.

For the dual microsphere designs, etch pits and a slight offset of the microsphere placement wells may be used to mass balance the asymmetrically etched resonator well and diagonalize the inertia tensor. The coplanar flexure design does not require etch pits, rather the focus is on the placement well for the microsphere which is designed to provide the right insertion depth for the sphere to bring the center of mass up to the top surface.

It will thus be seen that the objects set forth above, among those elucidated in, or made apparent from, the preceding description are efficiently attained and, since certain changes may be made in the above construction, without departing from the scope of the invention, it is intended that all matter contained in the above description or shown in the accompanying drawings shall be interpreted as illustrative and not in a limiting sense.

What is claimed is:

1. A micromachined sensor for measuring linear and angular motion, said sensor comprising:

a generally planar substrate, wherein said substrate is generally aligned in a wafer plane defined by a first axis and a second axis, wherein said second axis is orthogonal to said first axis, wherein said substrate is generally perpendicular to a third axis which is orthogonal to said wafer plane, and wherein said substrate is formed to include:
- a frame having an inner cavity;
- a proof mass disposed in said inner cavity, said proof mass having a top surface and a bottom surface;
- flexural support means for connecting said proof mass to said frame and suspending said proof mass within said cavity; and
- a plurality of resonators, including at least two opposite resonators which are disposed on opposite sides of said proof mass;

excitation means for vibrating said proof mass at a dither frequency;

sensing means for sensing the vibration of said resonators; and means for mounting said excitation means and said sensing means adjacent said proof mass;

wherein said proof mass is capable of vibrating outside said wafer plane;

whereby said proof mass is capable of applying linear acceleration and rotational Coriolis forces, or displacements caused thereby, to said resonators in response to linear and angular motion of said sensor.

2. The sensor according to claim 1 wherein said plurality of resonators further comprises at least two offset resonators which are disposed on different planes, said different planes being generally parallel to said wafer plane.

3. The sensor according to claim 1 wherein plurality of resonators further comprises at least two coplanar resonators.

4. The sensor according to claim 1 wherein linear movement of said sensor along said third axis causes said proof mass to modulate resonant frequencies of said resonators, wherein a vibration frequency around a natural resonant frequency of one of said resonators increases while a vibration frequency around a natural resonant frequency of an opposite resonator decreases, and wherein the difference in vibrational frequency around the natural resonant frequency between said resonators is proportional to a translation of said sensor along said third axis.

5. The sensor according to claim 1 wherein rotational movement of said sensor about said third axis creates Coriolis forces which induce an oscillating torque on said proof mass about said first axis, thereby causing said proof mass to modulate a vibration frequency of said resonators, wherein the vibration frequency of a first resonator is increased while the vibration frequency of a second resonator decreases, wherein the difference in vibration frequency of said first and second resonators is proportional to a rotation rate of said sensor about said third axis.

6. The sensor according to claim 1 wherein said means for vibrating said proof mass further comprises means for rotationally dithering said proof mass about said second axis at said dither frequency.

7. The sensor according to claim 1 wherein said plurality of resonators further comprises:
- a first resonator disposed proximate said top surface of said proof mass and generally along said second axis; and
- a second resonator disposed proximate said bottom surface of said proof mass and generally along said second axis.

8. The sensor according to claim 1 wherein the natural resonant frequencies of said resonators are substantially equal.

9. The sensor according to claim 1 wherein said mounting means further comprises a pair of caps, each cap having an inner surface and an outer surface, wherein said inner surface is provided with a well, wherein said generally planar substrate is disposed between said caps and attached thereto, and wherein said wells are adapted to allow said proof mass to vibrate outside said wafer plane.

10. The sensor according to claim 9 wherein said means for vibrating said proof mass further comprises:
- a plurality of electrodes disposed in at least one of said wells and adjacent said proof mass, said plurality of electrodes including at least one proof mass driver electrode for providing electrostatic forces to said proof mass thereby causing said proof mass to vibrate at said dither frequency;
- electronic circuitry, connected to said plurality of electrodes, for exciting said plurality of electrodes and for sensing modulations in vibration frequencies of said plurality of resonators caused by the linear acceleration and rotational Coriolis forces so as to produce acceleration and rotation signals indicative of the linear and angular motion of said sensor; and
- means for connecting said electronic circuitry to said plurality of electrodes.

11. The sensor according to claim 10 wherein said plurality of electrodes further comprise a plurality of proof mass balance electrodes.

12. The sensor according to claim 11 wherein said balance electrodes further comprise a plurality of diagonal balance electrodes.

13. The sensor according to claim 10 further comprising means for damping proof mass resonance about said first axis in order to improve dynamic response.

14. The sensor according to claim 13 wherein said proof mass resonance damping means further comprises means for applying an oscillating voltage to said electrodes.

15. The sensor according to claim 10 wherein said at least one driver electrode rotationally dithers said proof mass about said second axis at said dither frequency.

16. The sensor according to claim 10 wherein said means for connecting said electronic circuitry to said plurality of electrodes further comprises at least one electroplated feedthrough hole disposed through at least one of said caps; and wherein said feedthrough hole is adapted to supply electrical energy to said electrodes.

17. The sensor according to claim 1 wherein at least one of said resonators further comprises a cantilever beam having a proximal end attached to said proof mass and a free distal end extending into said cavity.

18. The sensor according to claim 1 wherein a vibration frequency corresponding to a linear movement is modulated about a frequency which differs from said dither frequency.

19. The sensor according to claim 1 further comprising means for decoupling resonator modes of opposed said resonators.

20. The sensor according to claim 1 wherein at least two of said resonators have a frequency mismatch.

21. The sensor according to claim 1 wherein said sensor is adapted to exhibit a diagonal inertia tensor, equal rotational frequencies.

22. The sensor according to claim 1 wherein said flexural support means further comprises a first plurality of opposed flexural supports generally disposed in a first plane, wherein said first plane is generally parallel to said wafer plane.

23. The sensor according to claim 22 wherein said flexural support means further comprises a second plurality of opposed flexural supports generally disposed in a second plane, wherein said second plane is generally parallel to said wafer plane, and wherein said second plane is offset from said first plane.

24. The sensor according to claim 23 wherein said flexural support means further comprises a plurality of diagonally opposed flexural supports.

25. The sensor according to claim 24 wherein said diagonally opposed flexural supports further comprises four supports.

26. The sensor according to claim 24 wherein said diagonally opposed flexural supports further comprises eight supports.

27. The sensor according to claim 24 wherein said diagonally opposed flexural supports are coplanar.

28. The sensor according to claim 1 further comprising at least one body attached to said proof mass, whereby the mass and at least one moment of inertia of said proof mass is increased.

29. The sensor according to claim 28 wherein said body is bonded to said proof mass.

30. The sensor according to claim 28 wherein said body further comprises at least two opposing bodies attached to opposite sides of said proof mass.

31. The sensor according to claim 28 wherein said body is generally spherical.

32. The sensor according to claim 28 wherein said means for mounting said excitation means and said sensing means adjacent said proof mass further comprises at least one throughhole adapted to allow at least a portion of said body to extend therethrough.

33. The sensor according to claim 10 wherein said electronic circuitry further comprises a proof mass oscillator for exciting said proof mass through said plurality of electrodes.

34. The sensor according to claim 33 wherein said proof mass oscillator senses a first natural resonant frequency of said proof mass and provides a reference frequency output relating thereto.

35. The sensor according to claim 10 wherein said electronic circuitry further comprises resonator oscillator means for exciting said resonators.

36. The sensor according to claim 35 wherein said resonator oscillator means sense modulations in said plurality of resonators and provides frequency modulated outputs related thereto.

37. The sensor according to claim 36 wherein said electronic circuitry further comprises demodulators for processing said frequency modulated outputs and for providing linear acceleration signals and rotational velocity signals.

38. The sensor according to claim 37 wherein said electronic circuitry further comprises a differential synchronous detector for processing said rotational velocity signals and for providing differential rotational velocity signals.

39. The sensor according to claim 37 wherein said electronic circuitry further comprises a differential frequency counter for processing said linear acceleration signals and for providing differential linear acceleration signals.

* * * * *